(12) United States Patent
Kim et al.

(10) Patent No.: US 12,185,306 B2
(45) Date of Patent: Dec. 31, 2024

(54) METHOD AND APPARATUS FOR REPEATEDLY TRANSMITTING UPLINK CHANNEL IN WIRELESS COMMUNICATION SYSTEM

(71) Applicant: LG ELECTRONICS INC., Seoul (KR)

(72) Inventors: Hyungtae Kim, Seoul (KR); Duckhyun Bae, Seoul (KR); Jiwon Kang, Seoul (KR); Hyunho Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 356 days.

(21) Appl. No.: 17/758,326

(22) PCT Filed: Jan. 19, 2021

(86) PCT No.: PCT/KR2021/000758
§ 371 (c)(1),
(2) Date: Jul. 1, 2022

(87) PCT Pub. No.: WO2021/162264
PCT Pub. Date: Aug. 19, 2021

(65) Prior Publication Data
US 2023/0045971 A1  Feb. 16, 2023

(30) Foreign Application Priority Data

Feb. 10, 2020  (KR) .................. 10-2020-0015986

(51) Int. Cl.
H04W 72/1268 (2023.01)
H04L 1/00 (2006.01)
(Continued)

(52) U.S. Cl.
CPC ....... *H04W 72/1268* (2013.01); *H04L 1/0003* (2013.01); *H04L 5/0012* (2013.01); *H04W 72/23* (2023.01)

(58) Field of Classification Search
None
See application file for complete search history.

(56) References Cited

U.S. PATENT DOCUMENTS

2020/0015200 A1  1/2020 Vilaipornsawai et al.
2022/0159682 A1* 5/2022 Liu .................. H04W 72/1268
(Continued)

OTHER PUBLICATIONS

PCT International Application No. PCT/KR2021/000758, International Search Report dated Apr. 12, 2021, 4 pages.
(Continued)

*Primary Examiner* — Nguyen H Ngo
(74) *Attorney, Agent, or Firm* — LEE, HONG, DEGERMAN, KANG & WAIMEY

(57) ABSTRACT

Disclosed are a method and apparatus for repeatedly transmitting an uplink in a wireless communication system. A method by which a terminal repeatedly transmits a physical uplink shared channel (PUSCH), according to an embodiment of the present disclosure, comprises the steps of: receiving configuration information related to repeated transmission of the PUSCH; receiving downlink control information (DCI) for scheduling of the PUSCH; and repeatedly transmitting the PUSCH N times (an integer, greater than 1, of N) on the basis of the configuration information and the DCI. The PUSCH transmitted N times is circularly and sequentially mapped to a plurality of transmission configuration indicator (TCI) states in an ascending order, may be grouped into M PUSCH groups (an integer, greater than 1, of N) for each PUSCH to which the same TCI is mapped, and frequency hopping may be individually applied to the M PUSCH groups.

12 Claims, 12 Drawing Sheets

(51) Int. Cl.
   *H04L 5/00* (2006.01)
   *H04W 72/23* (2023.01)

(56) References Cited

U.S. PATENT DOCUMENTS

2022/0287034 A1* 9/2022 Zhang ................... H04L 1/1812
2022/0295519 A1* 9/2022 Takahashi ............. H04L 5/0044
2022/0322396 A1* 10/2022 Yu ....................... H04L 25/0226

OTHER PUBLICATIONS

Ericsson, "PUSCH Enhancements for NR URLLC," R1-1911947, 3GPP TSG RAN WG1 Meeting #99, Nov. 2019, 15 pages.
LG Electronics, "PUSCH enhancements for NR URLLC," R1-1912398, 3GPP TSG RAN WG1 #99, Nov. 2019, 13 pages.
NTT Docomo, Inc, "Enhancements on multi-TRP/panel transmission," R1-1906224, 3GPP TSG RAN WG1 #97, May 2019, 32 pages.
Mediatek Inc., "On repetition schemes for NR PUSCH," R1-1906567, 3GPP TSG RAN WG1 Meeting #97, May 2019, 4 pages.

* cited by examiner

METHOD AND APPARATUS FOR REPEATEDLY TRANSMITTING UPLINK CHANNEL IN WIRELESS COMMUNICATION SYSTEM

CROSS-REFERENCE TO RELATED APPLICATIONS

This application is the National Stage filing under 35 U.S.C. 371 of International Application No. PCT/KR2021/000758, filed on Jan. 19, 2021, which claims the benefit of earlier filing date and right of priority to Korean Application No. 10-2020-0015986, filed on Feb. 10, 2020, the contents of which are all hereby incorporated by reference herein in their entireties.

TECHNICAL FIELD

The present disclosure relates to a wireless communication system, and in more detail, relates to a method and an apparatus of repeatedly transmitting an uplink channel in a wireless communication system.

BACKGROUND ART

A mobile communication system has been developed to provide a voice service while guaranteeing mobility of users. However, a mobile communication system has extended even to a data service as well as a voice service, and currently, an explosive traffic increase has caused shortage of resources and users have demanded a faster service, so a more advanced mobile communication system has been required.

The requirements of a next-generation mobile communication system at large should be able to support accommodation of explosive data traffic, a remarkable increase in a transmission rate per user, accommodation of the significantly increased number of connected devices, very low End-to-End latency and high energy efficiency. To this end, a variety of technologies such as Dual Connectivity, Massive Multiple Input Multiple Output (Massive MIMO), In-band Full Duplex, Non-Orthogonal Multiple Access (NOMA), Super wideband Support, Device Networking, etc. have been researched.

DISCLOSURE

Technical Problem

When an uplink channel is repeatedly transmitted to multiple transmission reception points (TRP) of the terminal, if a conventional repetitive transmission method of an uplink channel is used as it is, a frequency diversity gain cannot be obtained, and there is a problem in that channel estimation performance is deteriorated.

A technical object of the present disclosure is to provide a method and an apparatus for a terminal to repeatedly transmit an uplink channel to multiple TRPs.

In addition, an additional technical object of the present disclosure is to provide a method and an apparatus for applying frequency hopping for repeated transmission of an uplink channel to multiple TRPs of a terminal.

In addition, an additional technical object of the present disclosure is to provide a method and an apparatus for mapping/allocating a transmission configuration indicator (TCI) for repeated transmission of an uplink channel to multiple TRPs of a terminal.

The technical objects to be achieved by the present disclosure are not limited to the above-described technical objects, and other technical objects which are not described herein will be clearly understood by those skilled in the pertinent art from the following description.

Technical Solution

A method of repeatedly transmitting a physical uplink shared channel (PUSCH) by a terminal in a wireless communication system according to an aspect of the present disclosure may include receiving configuration information related to repeated transmission of the PUSCH; receiving downlink control information (DCI) for scheduling the PUSCH; and repeatedly transmitting the PUSCH N times (N is an integer greater than 1) based on the configuration information and the DCI. A plurality of transmission configuration indicator (TCI) states may be sequentially and circularly mapped to the N PUSCHs in an ascending order, PUSCHs mapped with an identical TCI may be grouped into M (N is an integer greater than 1) PUSCH groups, frequency hopping may be individually applied to the M PUSCH groups.

A terminal for repeatedly transmitting a physical uplink shared channel (PUSCH) in a wireless communication system according to an additional aspect of the present disclosure may include at least one transceiver for transmitting and receiving a radio signal; and at least one processor for controlling the at least one transceiver. The processor may be configured to: receive configuration information related to repeated transmission of the PUSCH; receive downlink control information (DCI) for scheduling the PUSCH; and repeatedly transmit the PUSCH N times (N is an integer greater than 1) based on the configuration information and the DCI. A plurality of transmission configuration indicator (TCI) states may be sequentially and circularly mapped to the N PUSCHs in an ascending order, PUSCHs mapped with an identical TCI may be grouped into M (N is an integer greater than 1) PUSCH groups, frequency hopping may be individually applied to the M PUSCH groups.

A recoding medium storing a program for executing a method of repeatedly transmitting a physical uplink shared channel (PUSCH) by a terminal in a wireless communication system according to an additional aspect of the present disclosure may include receiving configuration information related to repeated transmission of the PUSCH; receiving downlink control information (DCI) for scheduling the PUSCH; and repeatedly transmitting the PUSCH N times (N is an integer greater than 1) based on the configuration information and the DCI. A plurality of transmission configuration indicator (TCI) states may be sequentially and circularly mapped to the N PUSCHs in an ascending order, PUSCHs mapped with an identical TCI may be grouped into M (N is an integer greater than 1) PUSCH groups, frequency hopping may be individually applied to the M PUSCH groups.

Preferably, the N PUSCHs may be transmitted repeatedly in N slots by transmitting one PUSCH in one slot, and the frequency hopping may be applied at the slot level.

Preferably, the N PUSCHs may be transmitted in units of a plurality of symbols, and the frequency hopping may be applied for each transmission occasion of the N PUSCHs.

Preferably, a symbol gap may exist between contiguous PUSCHs in the N PUSCHs.

Preferably, the M PUSCH groups may be transmitted to different Transmission Reception Points (TRPs) using the TCI state mapped to each group, and the M PUSCH groups may be transmitted by applying a precoder and a modulation and coding scheme (MCS) based on a channel of each TRP.

Preferably, the plurality of TCI states may be configured by higher layer signaling.

Advantageous Effects

According to an embodiment of the present disclosure, when repeatedly transmitting an uplink channel to multiple TRPs of a terminal, a frequency diversity gain can be obtained.

In addition, according to an embodiment of the present disclosure, when repeatedly transmitting an uplink channel to multiple TRPs of a terminal, channel estimation performance can be improved.

Effects achievable by the present disclosure are not limited to the above-described effects, and other effects which are not described herein may be clearly understood by those skilled in the pertinent art from the following description.

DESCRIPTION OF DIAGRAMS

Accompanying drawings included as part of detailed description for understanding the present disclosure provide embodiments of the present disclosure and describe technical features of the present disclosure with detailed description.

BEST MODE

Figure 1:
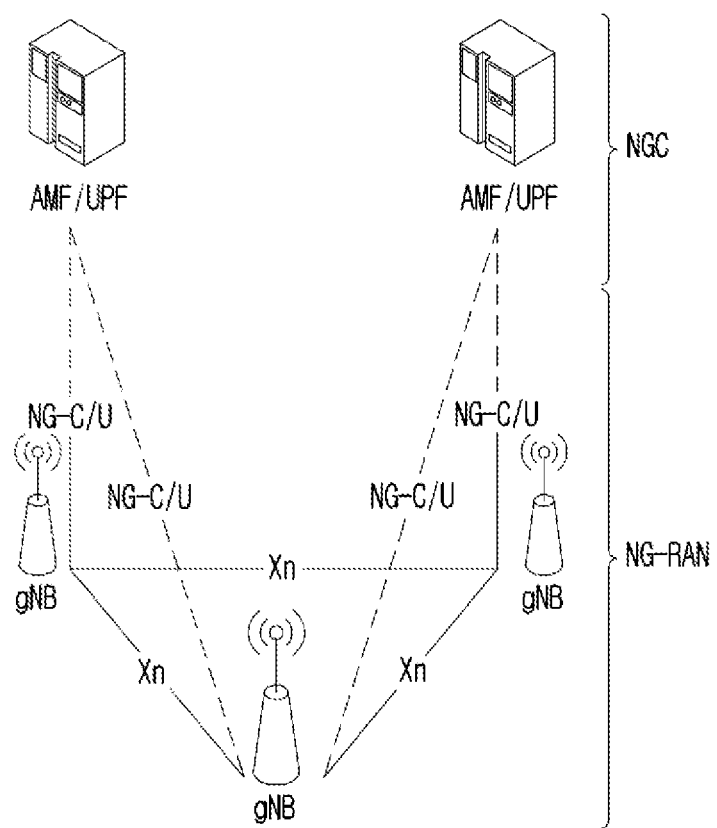
FIG. 1 illustrates a structure of a wireless communication system to which the present disclosure may be applied.

Hereinafter, embodiments according to the present disclosure will be described in detail by referring to accompanying drawings. Detailed description to be disclosed with accompanying drawings is to describe exemplary embodiments of the present disclosure and is not to represent the only embodiment that the present disclosure may be implemented. The following detailed description includes specific details to provide complete understanding of the present disclosure. However, those skilled in the pertinent art knows that the present disclosure may be implemented without such specific details.

In some cases, known structures and devices may be omitted or may be shown in a form of a block diagram based on a core function of each structure and device in order to prevent a concept of the present disclosure from being ambiguous.

In the present disclosure, when an element is referred to as being "connected", "combined" or "linked" to another element, it may include an indirect connection relation that yet another element presents therebetween as well as a direct connection relation. In addition, in the present disclosure, a term, "include" or "have", specifies the presence of a mentioned feature, step, operation, component and/or element, but it does not exclude the presence or addition of one or more other features, stages, operations, components, elements and/or their groups.

In the present disclosure, a term such as "first", "second", etc. is used only to distinguish one element from other element and is not used to limit elements, and unless otherwise specified, it does not limit an order or importance, etc. between elements. Accordingly, within a scope of the present disclosure, a first element in an embodiment may be referred to as a second element in another embodiment and likewise, a second element in an embodiment may be referred to as a first element in another embodiment.

A term used in the present disclosure is to describe a specific embodiment, and is not to limit a claim. As used in a described and attached claim of an embodiment, a singular form is intended to include a plural form, unless the context clearly indicates otherwise. A term used in the present disclosure, "and/or", may refer to one of related enumerated items or it means that it refers to and includes any and all possible combinations of two or more of them. In addition, "/" between words in the present disclosure has the same meaning as "and/or", unless otherwise described.

The present disclosure describes a wireless communication network or a wireless communication system, and an operation performed in a wireless communication network may be performed in a process in which a device (e.g., a base station) controlling a corresponding wireless communication network controls a network and transmits or receives a signal, or may be performed in a process in which a terminal associated to a corresponding wireless network transmits or receives a signal with a network or between terminals.

In the present disclosure, transmitting or receiving a channel includes a meaning of transmitting or receiving information or a signal through a corresponding channel. For example, transmitting a control channel means that control information or a control signal is transmitted through a control channel. Similarly, transmitting a data channel means that data information or a data signal is transmitted through a data channel.

Hereinafter, a downlink (DL) means a communication from a base station to a terminal and an uplink (UL) means a communication from a terminal to a base station. In a downlink, a transmitter may be part of a base station and a receiver may be part of a terminal. In an uplink, a transmitter may be part of a terminal and a receiver may be part of a base station. A base station may be expressed as a first communication device and a terminal may be expressed as a second communication device. A base station (BS) may be substituted with a term such as a fixed station, a Node B, an eNB (evolved-NodeB), a gNB (Next Generation NodeB), a BTS (base transceiver system), an Access Point (AP), a Network (5G network), an AI (Artificial Intelligence) system/module, an RSU (road side unit), a robot, a drone (UAV: Unmanned Aerial Vehicle), an AR (Augmented Reality) device, a VR (Virtual Reality) device, etc. In addition, a terminal may be fixed or mobile, and may be substituted with a term such as a UE (User Equipment), an MS (Mobile Station), a UT (user terminal), an MSS (Mobile Subscriber Station), an SS (Subscriber Station), an AMS (Advanced Mobile Station), a WT (Wireless terminal), an MTC (Machine-Type Communication) device, an M2M (Machine-to-Machine) device, a D2D (Device-to-Device) device, a vehicle, an RSU (road side unit), a robot, an AI (Artificial Intelligence) module, a drone (UAV: Unmanned Aerial Vehicle), an AR (Augmented Reality) device, a VR (Virtual Reality) device, etc.

The following description may be used for a variety of radio access systems such as CDMA, FDMA, TDMA, OFDMA, SC-FDMA, etc. CDMA may be implemented by a wireless technology such as UTRA (Universal Terrestrial Radio Access) or CDMA2000. TDMA may be implemented by a radio technology such as GSM (Global System for Mobile communications)/GPRS (General Packet Radio Service)/EDGE (Enhanced Data Rates for GSM Evolution). OFDMA may be implemented by a radio technology such as IEEE 802.11 (Wi-Fi), IEEE 802.16 (WiMAX), IEEE 802-20, E-UTRA (Evolved UTRA), etc. UTRA is a part of a UMTS (Universal Mobile Telecommunications System). 3GPP (3rd Generation Partnership Project) LTE (Long Term Evolution) is a part of an E-UMTS (Evolved UMTS) using E-UTRA and LTE-A (Advanced)/LTE-A pro is an advanced version of 3GPP LTE. 3GPP NR(New Radio or New Radio Access Technology) is an advanced version of 3GPP LTE/LTE-A/LTE-A pro.

To clarify description, it is described based on a 3GPP communication system (e.g., LTE-A, NR), but a technical idea of the present disclosure is not limited thereto. LTE means a technology after 3GPP TS (Technical Specification) 36.xxx Release 8. In detail, an LTE technology in or after 3GPP TS 36.xxx Release 10 is referred to as LTE-A and an LTE technology in or after 3GPP TS 36.xxx Release 13 is referred to as LTE-A pro. 3GPP NR means a technology in or after TS 38.xxx Release 15. LTE/NR may be referred to as a 3GPP system. "xxx" means a detailed number for a standard document. LTE/NR may be commonly referred to as a 3GPP system. For a background art, a term, an abbreviation, etc. used to describe the present disclosure, matters described in a standard document disclosed before the present disclosure may be referred to. For example, the following document may be referred to.

For 3GPP LTE, TS 36.211 (physical channels and modulation), TS 36.212 (multiplexing and channel coding), TS 36.213 (physical layer procedures), TS 36.300 (overall description), TS 36.331 (radio resource control) may be referred to.

For 3GPP NR, TS 38.211 (physical channels and modulation), TS 38.212 (multiplexing and channel coding), TS 38.213 (physical layer procedures for control), TS 38.214 (physical layer procedures for data), TS 38.300 (NR and NG-RAN(New Generation-Radio Access Network) overall description), TS 38.331 (radio resource control protocol specification) may be referred to.

Abbreviations of terms which may be used in the present disclosure is defined as follows.

BM: beam management
CQI: Channel Quality Indicator
CRI: channel state information—reference signal resource indicator
CSI: channel state information
CSI-IM: channel state information—interference measurement
CSI-RS: channel state information—reference signal
DMRS: demodulation reference signal
FDM: frequency division multiplexing
FFT: fast Fourier transform
IFDMA: interleaved frequency division multiple access
IFFT: inverse fast Fourier transform
L1-RSRP: Layer 1 reference signal received power
L1-RSRQ: Layer 1 reference signal received quality
MAC: medium access control
NZP: non-zero power
OFDM: orthogonal frequency division multiplexing
PDCCH: physical downlink control channel
PDSCH: physical downlink shared channel
PMI: precoding matrix indicator
RE: resource element
RI: Rank indicator
RRC: radio resource control
RSSI: received signal strength indicator
Rx: Reception
QCL: quasi co-location
SINR: signal to interference and noise ratio
SSB (or SS/PBCH block): Synchronization signal block (including PSS (primary synchronization signal), SSS (secondary synchronization signal) and PBCH (physical broadcast channel))
TDM: time division multiplexing
TRP: transmission and reception point
TRS: tracking reference signal
Tx: transmission
UE: user equipment
ZP: zero power Overall System As more communication devices have required a higher capacity, a need for an improved mobile broadband communication compared to the existing radio access technology (RAT) has emerged. In addition, massive MTC (Machine Type Communications) providing a variety of services anytime and anywhere by connecting a plurality of devices and things is also one of main issues which will be considered in a next-generation communication. Furthermore, a communication system design considering a service/a terminal sensitive to reliability and latency is also discussed. As such, introduction of a next-generation RAT considering eMBB (enhanced mobile broadband communication), mMTC (massive MTC), URLLC (Ultra-Reliable and Low Latency Communication), etc. is discussed and, for convenience, a corresponding technology is referred to as NR in the present disclosure. NR is an expression which represents an example of a 5G RAT.

A new RAT system including NR uses an OFDM transmission method or a transmission method similar to it. A new RAT system may follow OFDM parameters different from OFDM parameters of LTE. Alternatively, a new RAT system follows a numerology of the existing LTE/LTE-A as it is, but may support a wider system bandwidth (e.g., 100 MHz). Alternatively, one cell may support a plurality of numerologies. In other words, terminals which operate in accordance with different numerologies may coexist in one cell.

A numerology corresponds to one subcarrier spacing in a frequency domain. As a reference subcarrier spacing is scaled by an integer N, a different numerology may be defined.

FIG. 1 illustrates a structure of a wireless communication system to which the present disclosure may be applied.

In reference to FIG. 1, NG-RAN is configured with gNBs which provide a control plane (RRC) protocol end for a NG-RA (NG-Radio Access) user plane (i.e., a new AS (access stratum) sublayer/PDCP (Packet Data Convergence Protocol)/RLC(Radio Link Control)/MAC/PHY) and UE. The gNBs are interconnected through a Xn interface. The gNB, in addition, is connected to an NGC(New Generation Core) through an NG interface. In more detail, the gNB is connected to an AMF (Access and Mobility Management Function) through an N2 interface, and is connected to a UPF (User Plane Function) through an N3 interface.

Figure 2:
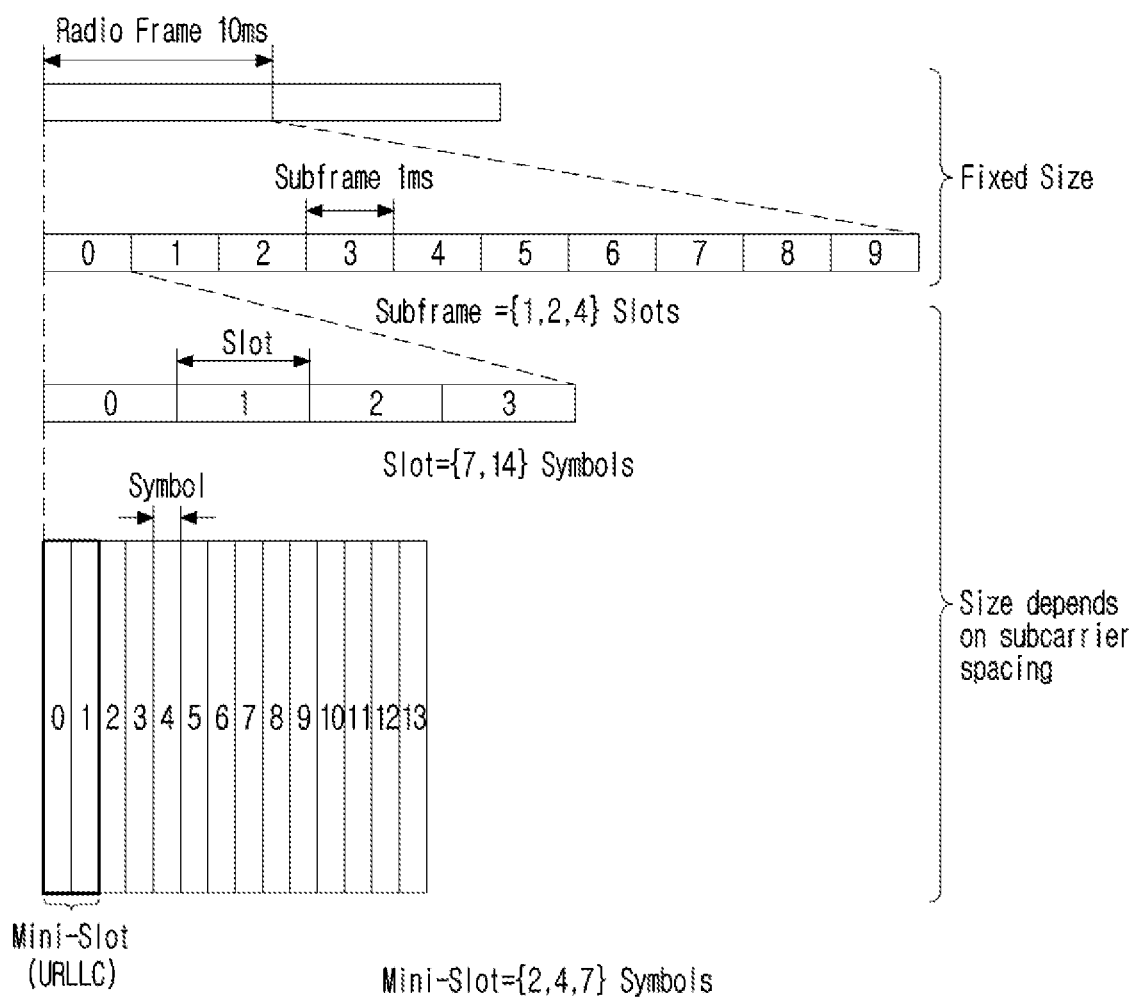
FIG. 2 illustrates a frame structure in a wireless communication system to which the present disclosure may be applied.

FIG. 2 illustrates a frame structure in a wireless communication system to which the present disclosure may be applied.

A NR system may support a plurality of numerologies. Here, a numerology may be defined by a subcarrier spacing and a cyclic prefix (CP) overhead. Here, a plurality of subcarrier spacings may be derived by scaling a basic (reference) subcarrier spacing by an integer N (or, μ). In addition, although it is assumed that a very low subcarrier spacing is not used in a very high carrier frequency, a used numerology may be selected independently from a frequency band. In addition, a variety of frame structures according to a plurality of numerologies may be supported in a NR system.

Hereinafter, an OFDM numerology and frame structure which may be considered in a NR system will be described. A plurality of OFDM numerologies supported in a NR system may be defined as in the following Table 1.

TABLE 1

| μ | $\Delta f = 2^\mu \cdot 15$ [kHz] | CP |
|---|---|---|
| 0 | 15 | Normal |
| 1 | 30 | Normal |
| 2 | 60 | Normal, Extended |
| 3 | 120 | Normal |
| 4 | 240 | Normal |

NR supports a plurality of numerologies (or subcarrier spacings (SCS)) for supporting a variety of 5G services. For example, when a SCS is 15 kHz, a wide area in traditional cellular bands is supported, and when a SCS is 30 kHz/60 kHz, dense-urban, lower latency and a wider carrier bandwidth are supported, and when a SCS is 60 kHz or higher, a bandwidth wider than 24.25 GHz is supported to overcome a phase noise.

An NR frequency band is defined as a frequency range in two types (FR1, FR2). FR1, FR2 may be configured as in the following Table 2. In addition, FR2 may mean a millimeter wave (mmW).

TABLE 2

| Frequency Range designation | Corresponding frequency range | Subcarrier Spacing |
|---|---|---|
| FR1 | 410 MHz–7125 MHz | 15, 30, 60 kHz |
| FR2 | 24250 MHz–52600 MHz | 60, 120, 240 kHz |

Regarding a frame structure in an NR system, a size of a variety of fields in a time domain is expresses as a multiple of a time unit of $T_c=1/(\Delta f_{max} \cdot N_f)$. Here, $\Delta f_{max}$ is 480·10³ Hz and $N_f$ is 4096. Downlink and uplink transmission is configured (organized) with a radio frame having a duration of $T_f=1/(\Delta f_{max} N_f/100) \cdot T_c = 10$ ms. Here, a radio frame is configured with 10 subframes having a duration of $T_{sf}=(\Delta f_{max} N_f/1000) \cdot T_c=1$ ms, respectively. In this case, there may be one set of frames for an uplink and one set of frames for a downlink. In addition, transmission in an uplink frame No. i from a terminal should start earlier by $T_{TA}=(N_{TA}+N_{TA,offset})T_c$ than a corresponding downlink frame in a corresponding terminal starts. For a subcarrier spacing configuration μ, slots are numbered in an increasing order of $n_s^\mu \in \{0, \ldots, N_{slot}^{subframe,\mu}-1\}$ in a subframe and are numbered in an increasing order of $n_{s,f}^\mu \in \{0, \ldots, N_{slot}^{frame,\mu}-1\}$ in a radio frame. One slot is configured with $N_{symb}^{slot}$ consecutive OFDM symbols and $N_{symb}^{slot}$ is determined according to CP. A start of a slot $n_s^\mu$ in a subframe is temporally arranged with a start of an OFDM symbol $n_s^\mu N_{symb}^{slot}$ in the same subframe. All terminals may not perform transmission and reception at the same time, which means that all OFDM symbols of a downlink slot or an uplink slot may not be used.

Table 3 represents the number of OFDM symbols per slot ($N_{symb}^{slot}$), the number of slots per radio frame ($N_{slot}^{frame,\mu}$) and the number of slots per subframe ($N_{slot}^{subframe,\mu}$) in a normal CP and Table 4 represents the number of OFDM symbols per slot, the number of slots per radio frame and the number of slots per subframe in an extended CP.

TABLE 3

| μ | $N_{symb}^{slot}$ | $N_{slot}^{frame, \mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 4

| μ | $N_{symb}^{slot}$ | $N_{slot}^{frame, \mu}$ | $N_{slot}^{subframe,\mu}$ |
|---|---|---|---|
| 2 | 12 | 40 | 4 |

FIG. 2 is an example on μ=2 (SCS is 60 kHz), 1 subframe may include 4 slots referring to Table 3. 1 subframe={1,2,4} slot shown in FIG. 2 is an example, the number of slots which may be included in 1 subframe is defined as in Table 3 or Table 4. In addition, a mini-slot may include 2, 4 or 7 symbols or more or less symbols.

Regarding a physical resource in a NR system, an antenna port, a resource grid, a resource element, a resource block, a carrier part, etc. may be considered. Hereinafter, the physical resources which may be considered in an NR system will be described in detail.

First, in relation to an antenna port, an antenna port is defined so that a channel where a symbol in an antenna port is carried can be inferred from a channel where other symbol in the same antenna port is carried. When a large-scale property of a channel where a symbol in one antenna port is carried may be inferred from a channel where a symbol in other antenna port is carried, it may be said that 2 antenna ports are in a QC/QCL (quasi co-located or quasi co-location) relationship. In this case, the large-scale property includes at least one of delay spread, doppler spread, frequency shift, average received power, received timing. FIG.

3 illustrates a resource grid in a wireless communication system to which the present disclosure may be applied.

Figure 3:
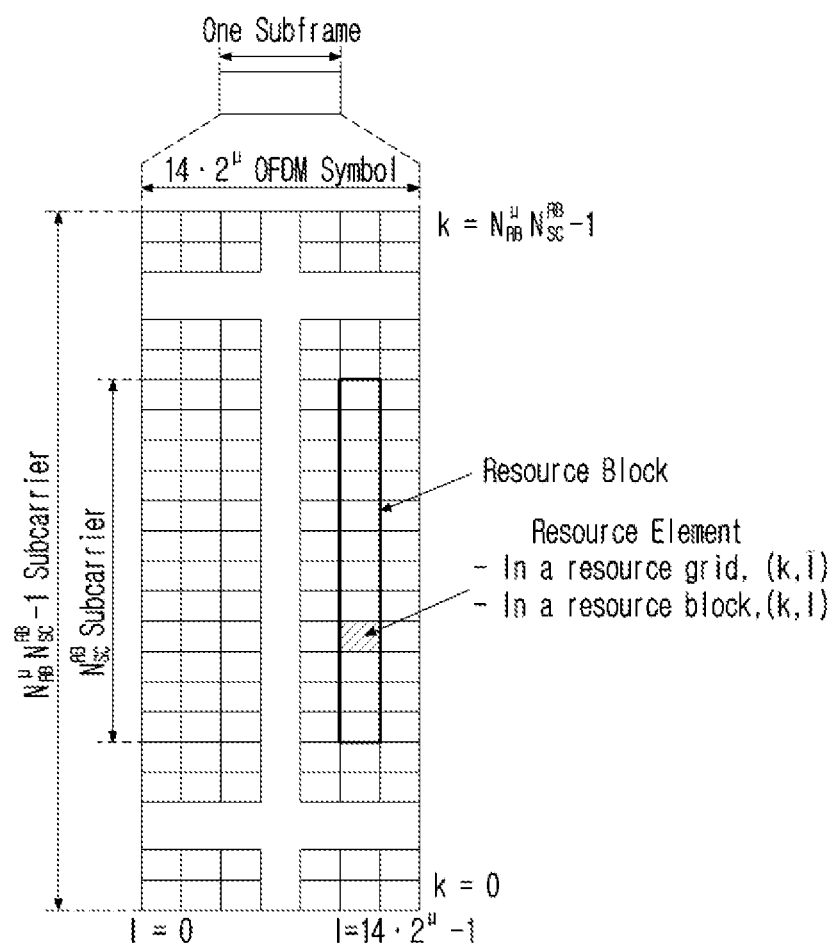
FIG. 3 illustrates a resource grid in a wireless communication system to which the present disclosure may be applied.

In reference to FIG. 3, it is illustratively described that a resource grid is configured with $N_{RB}^{\mu}N_{sc}^{RB}$ subcarriers in a frequency domain and one subframe is configured with 14·$2^{\mu}$ OFDM symbols, but it is not limited thereto. In an NR system, a transmitted signal is described by OFDM symbols of $2^{\mu}N_{symb}^{(\mu)}$ and one or more resource grids configured with $N_{RB}^{\mu}N_{sc}^{RB}$ subcarriers. Here, $N_{RB}^{\mu} \leq N_{RB}^{max,\mu}$. The $N_{RB}^{max,\mu}$ represents a maximum transmission bandwidth, which may be different between an uplink and a downlink as well as between numerologies. In this case, one resource grid may be configured per µ and antenna port p. Each element of a resource grid for µ and an antenna port p is referred to as a resource element and is uniquely identified by an index pair (k,l'). Here, k=0, . . . , $N_{RB}^{\mu}N_{sc}^{RB}-1$ is an index in a frequency domain and l'=0, . . . , $2^{\mu}N_{symb}^{(\mu)}-1$ refers to a position of a symbol in a subframe. When referring to a resource element in a slot, an index pair (k,l) is used. Here, l=0, . . . , $N_{symb}^{\mu}-1$. A resource element (k,l') for µ and an antenna port p corresponds to a complex value, $a_{k,l'}^{(p,\mu)}$. When there is no risk of confusion or when a specific antenna port or numerology is not specified, indexes p and µ may be dropped, whereupon a complex value may be $a_{k,l'}^{(p)}$ or $a_{k,l'}$. In addition, a resource block (RB) is defined as $N_{sc}^{RB}=12$ consecutive subcarriers in a frequency domain.

Point A plays a role as a common reference point of a resource block grid and is obtained as follows.

offsetToPointA for a primary cell (PCell) downlink represents a frequency offset between point A and the lowest subcarrier of the lowest resource block overlapped with a SS/PBCH block which is used by a terminal for an initial cell selection. It is expressed in resource block units assuming a 15 kHz subcarrier spacing for FR1 and a 60 kHz subcarrier spacing for FR2.

absoluteFrequencyPointA represents a frequency-position of point A expressed as in ARFCN (absolute radio-frequency channel number).

Common resource blocks are numbered from 0 to the top in a frequency domain for a subcarrier spacing configuration µ. The center of subcarrier 0 of common resource block 0 for a subcarrier spacing configuration µ is identical to 'point A'. A relationship between a common resource block number $n_{CRB}^{\mu}$ and a resource element (k,l) for a subcarrier spacing configuration µ in a frequency domain is given as in the following Equation 1.

$$n_{CRB}^{\mu} = \left\lfloor \frac{k}{N_{sc}^{RB}} \right\rfloor \quad \text{[Equation 1]}$$

In Equation 1, k is defined relatively to point A so that k=0 corresponds to a subcarrier centering in point A. Physical resource blocks are numbered from 0 to $N_{BWP,i}^{size,\mu}-1$ in a bandwidth part (BWP) and i is a number of a BWP. A relationship between a physical resource block npRB and a common resource block ncRB in BWP i is given by the following Equation 2.

$$n_{CRB}^{\mu} = n_{PRB}^{\mu} + N_{BWP,i}^{start,\mu} \quad \text{[Equation 2]}$$

$N_{BWP,i}^{start,\mu}$ is a common resource block that a BWP starts relatively to common resource block 0.

Figure 4:
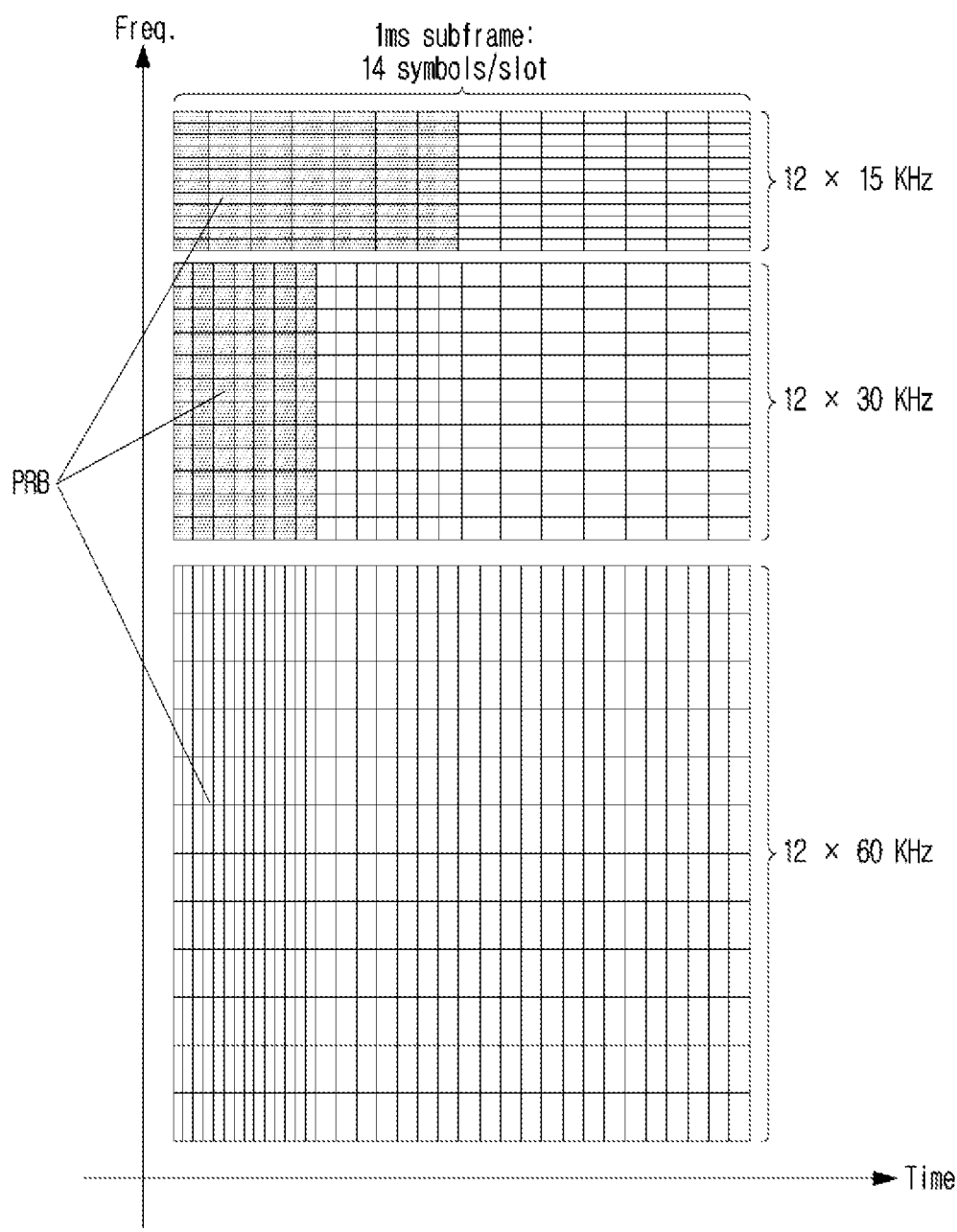
FIG. 4 illustrates a physical resource block in a wireless communication system to which the present disclosure may be applied.

FIG. 4 illustrates a physical resource block in a wireless communication system to which the present disclosure may be applied. And, FIG. 5 illustrates a slot structure in a wireless communication system to which the present disclosure may be applied.

Figure 5:
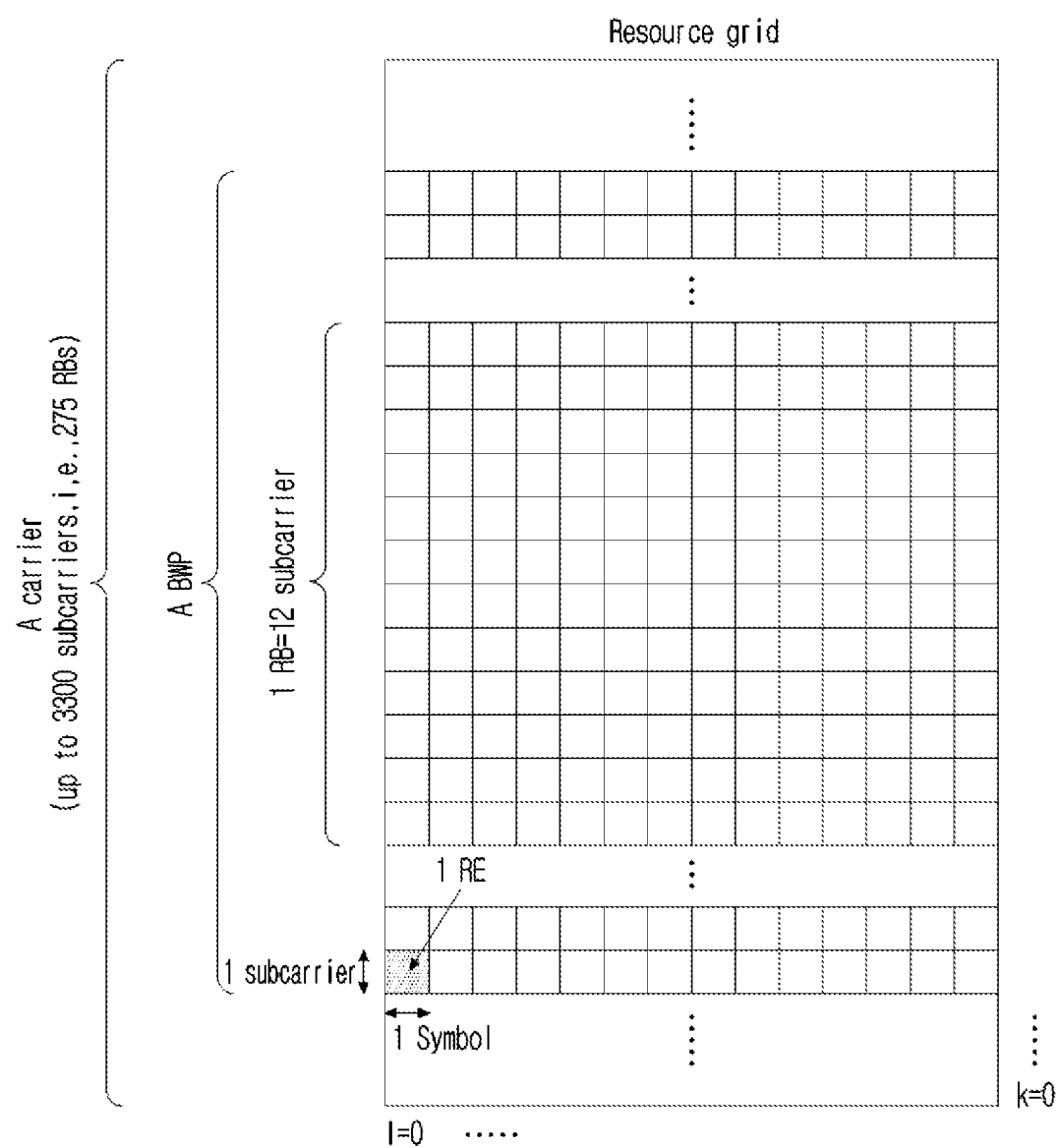
FIG. 5 illustrates a slot structure in a wireless communication system to which the present disclosure may be applied.

In reference to FIG. 4 and FIG. 5, a slot includes a plurality of symbols in a time domain. For example, for a normal CP, one slot includes 7 symbols, but for an extended CP, one slot includes 6 symbols.

A carrier includes a plurality of subcarriers in a frequency domain. An RB (Resource Block) is defined as a plurality of (e.g., 12) consecutive subcarriers in a frequency domain. A BWP (Bandwidth Part) is defined as a plurality of consecutive (physical) resource blocks in a frequency domain and may correspond to one numerology (e.g., an SCS, a CP length, etc.). A carrier may include a maximum N (e.g., 5) BWPs. A data communication may be performed through an activated BWP and only one BWP may be activated for one terminal. In a resource grid, each element is referred to as a resource element (RE) and one complex symbol may be mapped.

In an NR system, up to 400 MHz may be supported per component carrier (CC). If a terminal operating in such a wideband CC always operates turning on a radio frequency (FR) chip for the whole CC, terminal battery consumption may increase. Alternatively, when several application cases operating in one wideband CC (e.g., eMBB, URLLC, Mmtc, V2X, etc.) are considered, a different numerology (e.g., a subcarrier spacing, etc.) may be supported per frequency band in a corresponding CC. Alternatively, each terminal may have a different capability for the maximum bandwidth. By considering it, a base station may indicate a terminal to operate only in a partial bandwidth, not in a full bandwidth of a wideband CC, and a corresponding partial bandwidth is defined as a bandwidth part (BWP) for convenience. A BWP may be configured with consecutive RBs on a frequency axis and may correspond to one numerology (e.g., a subcarrier spacing, a CP length, a slot/a mini-slot duration).

Meanwhile, a base station may configure a plurality of BWPs even in one CC configured to a terminal. For example, a BWP occupying a relatively small frequency domain may be configured in a PDCCH monitoring slot, and a PDSCH indicated by a PDCCH may be scheduled in a greater BWP. Alternatively, when UEs are congested in a specific BWP, some terminals may be configured with other BWP for load balancing. Alternatively, considering frequency domain inter-cell interference cancellation between neighboring cells, etc., some middle spectrums of a full bandwidth may be excluded and BWPs on both edges may be configured in the same slot. In other words, a base station may configure at least one DL/UL BWP to a terminal associated with a wideband CC. A base station may activate at least one DL/UL BWP of configured DL/UL BWP(s) at a specific time (by L1 signaling or MAC CE (Control Element) or RRC signaling, etc.). In addition, a base station may indicate switching to other configured DL/UL BWP (by L1 signaling or MAC CE or RRC signaling, etc.). Alternatively, based on a timer, when a timer value is expired, it may be switched to a determined DL/UL BWP. Here, an activated DL/UL BWP is defined as an active DL/UL BWP. But, a configuration on a DL/UL BWP may not be received when a terminal performs an initial access procedure or before a RRC connection is set up, so a DL/UL BWP which is assumed by a terminal under these situations is defined as an initial active DL/UL BWP.

Figure 6:
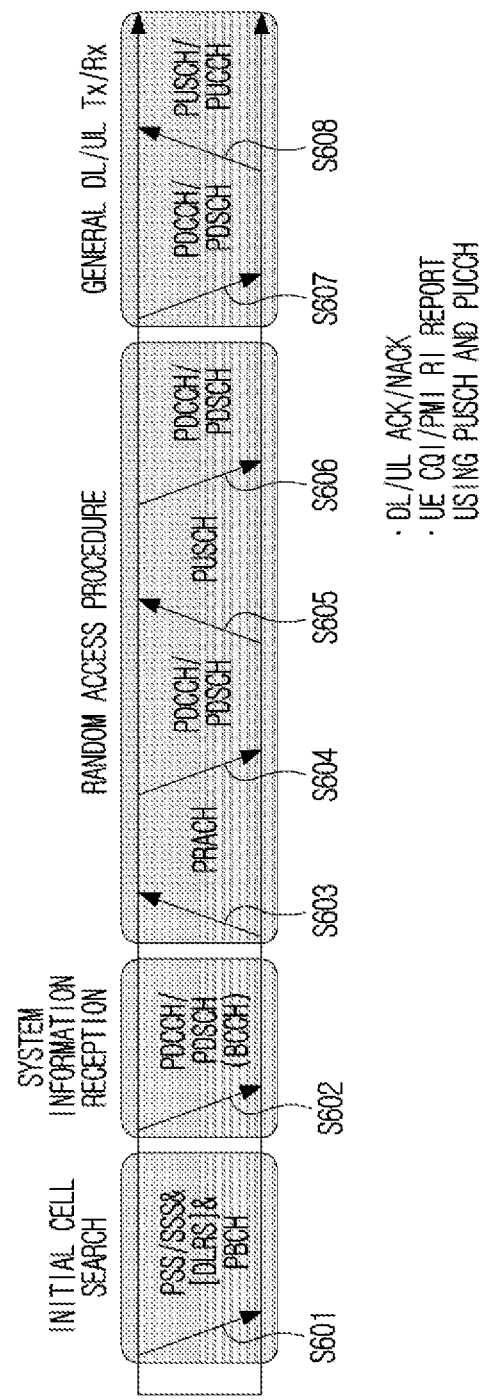
FIG. 6 illustrates physical channels used in a wireless communication system to which the present disclosure may be applied and a general signal transmission and reception method using them.

FIG. 6 illustrates physical channels used in a wireless communication system to which the present disclosure may be applied and a general signal transmission and reception method using them.

In a wireless communication system, a terminal receives information through a downlink from a base station and transmits information through an uplink to a base station.

Information transmitted and received by a base station and a terminal includes data and a variety of control information and a variety of physical channels exist according to a type/a usage of information transmitted and received by them.

When a terminal is turned on or newly enters a cell, it performs an initial cell search including synchronization with a base station or the like (S601). For the initial cell search, a terminal may synchronize with a base station by receiving a primary synchronization signal (PSS) and a secondary synchronization signal (SSS) from a base station and obtain information such as a cell identifier (ID), etc. After that, a terminal may obtain broadcasting information in a cell by receiving a physical broadcast channel (PBCH) from a base station. Meanwhile, a terminal may check out a downlink channel state by receiving a downlink reference signal (DL RS) at an initial cell search stage.

A terminal which completed an initial cell search may obtain more detailed system information by receiving a physical downlink control channel (PDCCH) and a physical downlink shared channel (PDSCH) according to information carried in the PDCCH (S602). Meanwhile, when a terminal accesses to a base station for the first time or does not have a radio resource for signal transmission, it may perform a random access (RACH) procedure to a base station (S603 to S606). For the random access procedure, a terminal may transmit a specific sequence as a preamble through a physical random access channel (PRACH) (S603 and S605) and may receive a response message for a preamble through a PDCCH and a corresponding PDSCH (S604 and S606). A contention based RACH may additionally perform a contention resolution procedure.

A terminal which performed the above-described procedure subsequently may perform PDCCH/PDSCH reception (S607) and PUSCH (Physical Uplink Shared Channel)/PUCCH (physical uplink control channel) transmission (S608) as a general uplink/downlink signal transmission procedure. In particular, a terminal receives downlink control information (DCI) through a PDCCH. Here, DCI includes control information such as resource allocation information for a terminal and a format varies depending on its purpose of use.

Meanwhile, control information which is transmitted by a terminal to a base station through an uplink or is received by a terminal from a base station includes a downlink/uplink ACK/NACK (Acknowledgement/Non-Acknowledgement) signal, a CQI (Channel Quality Indicator), a PMI (Precoding Matrix Indicator), a RI (Rank Indicator), etc. For a 3GPP LTE system, a terminal may transmit control information of the above-described CQI/PMI/RI, etc. through a PUSCH and/or a PUCCH.

Table 5 represents an example of a DCI format in an NR system.

TABLE 5

| DCI Format | Use |
| --- | --- |
| 0_0 | Scheduling of a PUSCH in one cell |
| 0_1 | Scheduling of one or multiple PUSCHs in one cell, or indication of cell group downlink feedback information to a UE |
| 0_2 | Scheduling of a PUSCH in one cell |
| 1_0 | Scheduling of a PDSCH in one DL cell |
| 1_1 | Scheduling of a PDSCH in one cell |
| 1_2 | Scheduling of a PDSCH in one cell |

In reference to Table 5, DCI formats 0_0, 0_1 and 0_2 may include resource information (e.g., UL/SUL (Supplementary UL), frequency resource allocation, time resource allocation, frequency hopping, etc.), information related to a transport block (TB) (e.g., MCS (Modulation Coding and Scheme), a NDI (New Data Indicator), a RV (Redundancy Version), etc.), information related to a HARQ (Hybrid-Automatic Repeat and request) (e.g., a process number, a DAI (Downlink Assignment Index), PDSCH-HARQ feedback timing, etc.), information related to multiple antennas (e.g., DMRS sequence initialization information, an antenna port, a CSI request, etc.), power control information (e.g., PUSCH power control, etc.) related to scheduling of a PUSCH and control information included in each DCI format may be pre-defined.

DCI format 0_0 is used for scheduling of a PUSCH in one cell. Information included in DCI format 0_0 is CRC (cyclic redundancy check) scrambled by a C-RNTI (Cell Radio Network Temporary Identifier) or a CS-RNTI (Configured Scheduling RNTI) or a MCS-C-RNTI (Modulation Coding Scheme Cell RNTI) and transmitted.

DCI format 0_1 is used to indicate scheduling of one or more PUSCHs or configure grant (CG) downlink feedback information to a terminal in one cell. Information included in DCI format 0_1 is CRC scrambled by a C-RNTI or a CS-RNTI or a SP-CSI-RNTI (Semi-Persistent CSI RNTI) or a MCS-C-RNTI and transmitted.

DCI format 0_2 is used for scheduling of a PUSCH in one cell. Information included in DCI format 0_2 is CRC scrambled by a C-RNTI or a CS-RNTI or a SP-CSI-RNTI or a MCS-C-RNTI and transmitted.

Next, DCI formats 1_0, 1_1 and 1_2 may include resource information (e.g., frequency resource allocation, time resource allocation, VRB (virtual resource block)-PRB (physical resource block) mapping, etc.), information related to a transport block (TB)(e.g., MCS, NDI, RV, etc.), information related to a HARQ (e.g., a process number, DAI, PDSCH-HARQ feedback timing, etc.), information related to multiple antennas (e.g., an antenna port, a TCI (transmission configuration indicator), a SRS (sounding reference signal) request, etc.), information related to a PUCCH (e.g., PUCCH power control, a PUCCH resource indicator, etc.) related to scheduling of a PDSCH and control information included in each DCI format may be pre-defined.

DCI format 1_0 is used for scheduling of a PDSCH in one DL cell. Information included in DCI format 1_0 is CRC scrambled by a C-RNTI or a CS-RNTI or a MCS-C-RNTI and transmitted.

DCI format 1_1 is used for scheduling of a PDSCH in one cell. Information included in DCI format 1_1 is CRC scrambled by a C-RNTI or a CS-RNTI or a MCS-C-RNTI and transmitted.

DCI format 1_2 is used for scheduling of a PDSCH in one cell. Information included in DCI format 1_2 is CRC scrambled by a C-RNTI or a CS-RNTI or a MCS-C-RNTI and transmitted.

Operation Related to Multi-TRPs

A coordinated multi point (CoMP) scheme refers to a scheme in which a plurality of base stations effectively control interference by exchanging (e.g., using an X2 interface) or utilizing channel information (e.g., RI/CQI/PMI/LI (layer indicator), etc.) fed back by a terminal and cooperatively transmitting to a terminal. According to a scheme used, a CoMP may be classified into joint transmission (JT), coordinated Scheduling (CS), coordinated Beamforming (CB), dynamic Point Selection (DPS), dynamic Point Blocking (DPB), etc. M-TRP transmission schemes that M TRPs transmit data to one terminal may be largely classified into i) eMBB M-TRP transmission, a scheme for improving a transfer rate, and ii) URLLC M-TRP transmission, a scheme for increasing a reception success rate and reducing latency.

In addition, with regard to DCI transmission, M-TRP transmission schemes may be classified into i) M-TRP transmission based on M-DCI (multiple DCI) that each TRP transmits different DCIs and ii) M-TRP transmission based on S-DCI (single DCI) that one TRP transmits DCI. For example, for S-DCI based M-TRP transmission, all scheduling information on data transmitted by M TRPs should be delivered to a terminal through one DCI, it may be used in an environment of an ideal BackHaul (ideal BH) where dynamic cooperation between two TRPs is possible.

For TDM based URLLC M-TRP transmission, scheme 3/4 is under discussion for standardization. Specifically, scheme 4 means a scheme in which one TRP transmits a transport block (TB) in one slot and it has an effect to improve a probability of data reception through the same TB received from multiple TRPs in multiple slots. Meanwhile, scheme 3 means a scheme in which one TRP transmits a TB through consecutive number of OFDM symbols (i.e., a symbol group) and TRPs may be configured to transmit the same TB through a different symbol group in one slot.

In addition, UE may recognize PUSCH (or PUCCH) scheduled by DCI received in different control resource sets (CORESETs)(or CORESETs belonging to different CORESET groups) as PUSCH (or PUCCH) transmitted to different TRPs or may recognize PDSCH (or PDCCH) from different TRPs. In addition, the below-described method for UL transmission (e.g., PUSCH/PUCCH) transmitted to different TRPs may be applied equivalently to UL transmission (e.g., PUSCH/PUCCH)transmitted to different panels belonging to the same TRP.

Hereinafter, multiple DCI based non-coherent joint transmission (NCJT)/single DCI based NCJT will be described.

NCJT (Non-coherent joint transmission) is a scheme in which a plurality of transmission points (TP) transmit data to one terminal by using the same time frequency resource, TPs transmit data by using a different DMRS (Demodulation Multiplexing Reference Signal) between TPs through a different layer (i.e., through a different DMRS port).

A TP delivers data scheduling information through DCI to a terminal receiving NCJT. Here, a scheme in which each TP participating in NCJT delivers scheduling information on data transmitted by itself through DCI is referred to as 'multi DCI based NCJT'. As each of N TPs participating in NCJT transmission transmits DL grant DCI and a PDSCH to UE, UE receives N DCI and N PDSCHs from N TPs. Meanwhile, a scheme in which one representative TP delivers scheduling information on data transmitted by itself and data transmitted by a different TP (i.e., a TP participating in NCJT) through one DCI is referred to as 'single DCI based NCJT'. Here, N TPs transmit one PDSCH, but each TP transmits only some layers of multiple layers included in one PDSCH. For example, when 4-layer data is transmitted, TP 1 may transmit 2 layers and TP 2 may transmit 2 remaining layers to UE.

Multiple TRPs (MTRPs) performing NCJT transmission may transmit DL data to a terminal by using any one scheme of the following two schemes.

First, 'a single DCI based MTRP scheme' is described. MTRPs cooperatively transmit one common PDSCH and each TRP participating in cooperative transmission spatially partitions and transmits a corresponding PDSCH into different layers (i.e., different DMRS ports) by using the same time frequency resource. Here, scheduling information on the PDSCH is indicated to UE through one DCI and which DMRS (group) port uses which QCL RS and QCL type information is indicated by the corresponding DCI (which is different from DCI indicating a QCL RS and a type which will be commonly applied to all DMRS ports indicated as in the existing scheme). In other words, M TCI states may be indicated through a TCI (Transmission Configuration Indicator) field in DCI (e.g., for 2 TRP cooperative transmission, M=2) and a QCL RS and a type may be indicated by using M different TCI states for M DMRS port group. In addition, DMRS port information may be indicated by using a new DMRS table.

Next, 'a multiple DCI based MTRP scheme' is described. Each of MTRPs transmits different DCI and PDSCH and (part or all of) the corresponding PDSCHs are overlapped each other and transmitted in a frequency time resource. Corresponding PDSCHs may be scrambled through a different scrambling ID (identifier) and the DCI may be transmitted through a CORESET belonging to a different CORESET group. (Here, a CORESET group may be identified by an index defined in a CORESET configuration of each CORESET. For example, when index=0 is configured for CORESETs 1 and 2 and index=1 is configured for CORESETs 3 and 4, CORESETs 1 and 2 are CORESET group 0 and CORESET 3 and 4 belong to a CORESET group 1. In addition, when an index is not defined in a CORESET, it may be construed as index=0) When a plurality of scrambling IDs are configured or two or more CORESET groups are configured in one serving cell, a UE may notice that it receives data according to a multiple DCI based MTRP operation.

Alternatively, whether of a single DCI based MTRP scheme or a multiple DCI based MTRP scheme may be indicated to UE through separate signaling. In an example, for one serving cell, a plurality of CRS (cell reference signal) patterns may be indicated to UE for a MTRP operation. In this case, PDSCH rate matching for a CRS may be different depending on a single DCI based MTRP scheme or a multiple DCI based MTRP scheme (because a CRS pattern is different).

Hereinafter, a CORESET group ID described/mentioned in the present disclosure may mean an index/identification information (e.g., an ID, etc.) for distinguishing a CORESET for each TRP/panel. In addition, a CORESET group may be a group/union of CORESET distinguished by an index/identification information (e.g., an ID)/the CORESET group ID, etc. for distinguishing a CORESET for each TRP/panel. In an example, a CORESET group ID may be specific index information defined in a CORESET configuration. In this case, a CORESET group may be configured/indicated/defined by an index defined in a CORESET configuration for each CORESET. Additionally/alternatively, a CORESET group ID may mean an index/identification information/an indicator, etc. for distinguishment/identification between CORESETs configured/associated with each TRP/panel. Hereinafter, a CORESET group ID described/mentioned in the present disclosure may be expressed by being substituted with a specific index/specific identification information/a specific indicator for distinguishment/identification between CORESETs configured/associated with each TRP/panel. The CORESET group ID, i.e., a specific index/specific identification information/a specific indicator for distinguishment/identification between CORESETs configured/associated with each TRP/panel may be configured/indicated to a terminal through higher layer signaling (e.g., RRC signaling)/L2 signaling (e.g., MAC-CE)/L1 signaling (e.g., DCI), etc. In an example, it may be configured/indicated so that PDCCH detection will be performed per each TRP/panel in a unit of a corresponding CORESET group (i.e., per TRP/panel belonging to the same CORESET group). Additionally/alternatively, it may be configured/indicated so that uplink control information (e.g., CSI, HARQ-A/N (ACK/NACK), SR (scheduling request)) and/or uplink physical channel resources (e.g., PUCCH/PRACH/SRS resources) are separated and managed/controlled per each TRP/panel in a unit of a corresponding CORESET group (i.e., per TRP/panel belonging to the same CORESET group). Additionally/alternatively, HARQ A/N (process/retransmission) for PDSCH/PUSCH, etc. scheduled per each TRP/panel may be managed per corresponding CORESET group (i.e., per TRP/panel belonging to the same CORESET group).

Hereinafter, partially overlapped NCJT will be described.

In addition, NCJT may be classified into fully overlapped NCJT that time frequency resources transmitted by each TP are fully overlapped and partially overlapped NCJT that only some time frequency resources are overlapped. In other words, for partially overlapped NCJT, data of both of TP 1 and TP 2 are transmitted in some time frequency resources and data of only one TP of TP 1 or TP 2 is transmitted in remaining time frequency resources.

Hereinafter, a method for improving reliability in Multi-TRP will be described.

As a transmission and reception method for improving reliability using transmission in a plurality of TRPs, the following two methods may be considered.

Figure 7:
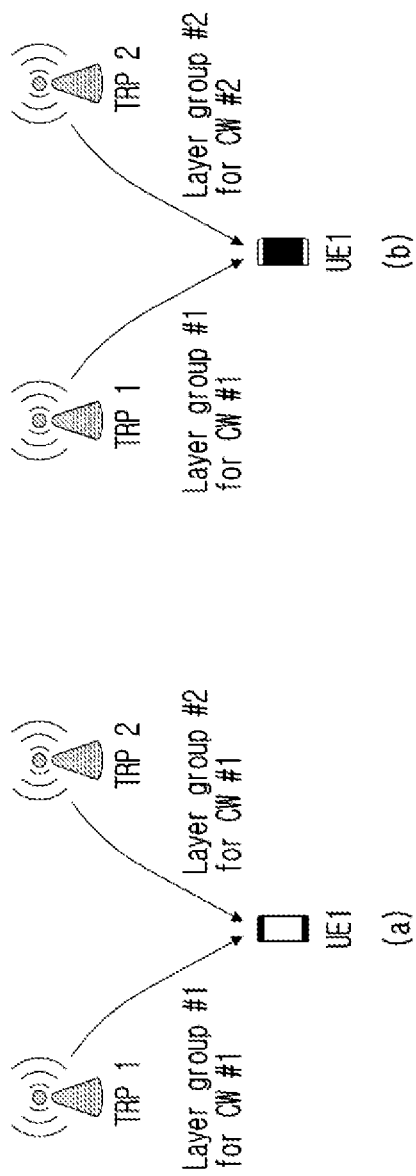
FIG. 7 illustrates a method of transmitting multiple TRPs in a wireless communication system to which the present disclosure may be applied.

FIG. 7 illustrates a method of multiple TRPs transmission in a wireless communication system to which the present disclosure may be applied.

In reference to FIG. 7(a), it is shown a case in which layer groups transmitting the same codeword (CW)/transport block (TB) correspond to different TRPs. Here, a layer group may mean a predetermined layer set including one or more layers. In this case, there is an advantage that the amount of transmitted resources increases due to the number of a plurality of layers and thereby a robust channel coding with a low coding rate may be used for a TB, and additionally, because a plurality of TRPs have different channels, it may be expected to improve reliability of a received signal based on a diversity gain.

In reference to FIG. 7(b), an example that different CWs are transmitted through layer groups corresponding to different TRPs is shown. Here, it may be assumed that a TB corresponding to CW #1 and CW #2 in the drawing is identical to each other. In other words, CW #1 and CW #2 mean that the same TB is respectively transformed through channel coding, etc. into different CWs by different TRPs. Accordingly, it may be considered as an example that the same TB is repetitively transmitted. In case of FIG. 7(b), it may have a disadvantage that a code rate corresponding to a TB is higher compared to FIG. 7(a). However, it has an advantage that it may adjust a code rate by indicating a different RV (redundancy version) value or may adjust a modulation order of each CW for encoded bits generated from the same TB according to a channel environment.

According to methods illustrated in FIG. 7(a) and FIG. 7(b) above, probability of data reception of a terminal may be improved as the same TB is repetitively transmitted through a different layer group and each layer group is transmitted by a different TRP/panel. It is referred to as a SDM (Spatial Division Multiplexing) based M-TRP URLLC transmission method. Layers belonging to different layer groups are respectively transmitted through DMRS ports belonging to different DMRS CDM groups.

In addition, the above-described contents related to multiple TRPs are described based on an SDM (spatial division multiplexing) method using different layers, but it may be naturally extended and applied to a FDM (frequency division multiplexing) method based on a different frequency domain resource (e.g., RB/PRB (set), etc.) and/or a TDM (time division multiplexing) method based on a different time domain resource (e.g., a slot, a symbol, a sub-symbol, etc.).

Regarding a method for multiple TRPs based URLLC scheduled by single DCI, the following methods are discussed.

1) Method 1 (SDM): Time and Frequency Resource Allocation is Overlapped and n (n<=Ns) TCI States in a Single Slot 1-a) Method 1a The same TB is transmitted in one layer or layer set at each transmission time (occasion) and each layer or each layer set is associated with one TCI and one set of DMRS port(s).

A single codeword having one RV is used in all spatial layers or all layer sets. With regard to UE, different coded bits are mapped to a different layer or layer set by using the same mapping rule.

1-b) Method 1b

The same TB is transmitted in one layer or layer set at each transmission time (occasion) and each layer or each layer set is associated with one TCI and one set of DMRS port(s).

A single codeword having one RV is used in each spatial layer or each layer set. RV(s) corresponding to each spatial layer or each layer set may be the same or different.

1-c) Method 1c

The same TB having one DMRS port associated with multiple TCI state indexes is transmitted in one layer at one transmission time (occasion) or the same TB having multiple DMRS ports one-to-one associated with multiple TCI state indexes is transmitted in one layer.

In case of the above-described method 1a and 1c, the same MCS is applied to all layers or all layer sets.

2) Method 2 (FDM): Frequency Resource Allocation is not Overlapped and n (n<=Nf) TCI States in a Single Slot Each non-overlapping frequency resource allocation is associated with one TCI state.

The same single/multiple DMRS port(s) are associated with all non-overlapping frequency resource allocation.

2-a) Method 2a

A single codeword having one RV is used for all resource allocation. With regard to UE, common RB matching (mapping of a codeword to a layer) is applied to all resource allocation.

2-b) Method 2b

A single codeword having one RV is used for each non-overlapping frequency resource allocation. A RV corresponding to each non-overlapping frequency resource allocation may be the same or different.

For the above-described method 2a, the same MCS is applied to all non-overlapping frequency resource allocation.

3) Method 3 (TDM): Time Resource Allocation is not Overlapped and n (n<=Nt1) TCI States in a Single Slot Each transmission time (occasion) of a TB has time granularity of a mini-slot and has one TCI and one RV.

A common MCS is used with a single or multiple DMRS port(s) at all transmission time (occasion) in a slot.

A RV/TCI may be the same or different at a different transmission time (occasion).

4) Method 4 (TDM): n (n<=Nt2) TCI States in K (n<=K) Different Slots

Each transmission time (occasion) of a TB has one TCI and one RV.

All transmission time (occasion) across K slots uses a common MCS with a single or multiple DMRS port(s).

A RV/TCI may be the same or different at a different transmission time (occasion).

Hereinafter, MTRP URLLC will be described.

In the present disclosure, DL MTRP-URLLC means that multiple TRPs transmit the same data (e.g., the same TB)/DCI by using a different layer/time/frequency resource. For example, TRP 1 transmits the same data/DCI in resource 1 and TRP 2 transmits the same data/DCI in resource 2. A UE configured with a DL MTRP-URLLC transmission method receives the same data/DCI by using a different layer/time/frequency resource. Here, UE is configured which QCL RS/type (i.e., a DL TCI (state)) should be used in a layer/time/frequency resource receiving the same data/DCI from a base station. For example, when the same data/DCI is received in resource 1 and resource 2, a DL TCI state used in resource 1 and a DL TCI state used in resource 2 may be indicated. A UE may achieve high reliability because it receives the same data/DCI through resource 1 and resource 2. Such DL MTRP URLLC may be applied to a PDSCH/a PDCCH.

In addition, in the present disclosure, UL MTRP-URLLC means that multiple TRPs receive the same data/UCI (uplink control information) from a UE by using a different layer/time/frequency resource. For example, TRP 1 receives the same data/DCI from a UE in resource 1 and TRP 2 receives the same data/DCI from a UE in resource 2 and shares received data/DCI through a backhaul link connected between TRPs. A UE configured with a UL MTRP-URLLC transmission method transmits the same data/UCI by using a different layer/time/frequency resource. Here, a UE is configured which Tx beam and which Tx power (i.e., a UL TCI state) should be used in a layer/time/frequency resource transmitting the same data/DCI from a base station. For example, when the same data/UCI is received in resource 1 and resource 2, a UL TCI state used in resource 1 and a UL TCI state used in resource 2 may be indicated. Such UL MTRP URLLC may be applied to a PUSCH/a PUCCH.

In addition, in the present disclosure, the meaning of using (or mapping) a specific TCI state (or a TCI) when receiving data/DCI/UCI for any frequency/time/space resource is as follows. In case of DL, it may mean that a channel is estimated from a DMRS by using a QCL type and a QCL RS indicated by a corresponding TCI state in a frequency/time/spatial resource (layer), and data/DCI is received/demodulated based on the estimated channel. In addition, in case of UL, it may mean that a DMRS and data/UCI are transmitted/modulated using a Tx beam and/or power indicated by a corresponding TCI state in a frequency/time/space resource.

Here, a UL TCI state has Tx beam and/or Tx power information of a UE and spatial relation information, etc. instead of a TCI state may be configured to a UE through other parameters. A UL TCI state may be directly indicated by UL grant DCI or may mean spatial relation information of an SRS resource indicated by an SRI (sounding resource indicator) field of UL grant DCI. Alternatively, it may mean an OL (open loop) Tx power control parameter associated with a value indicated by a SRI field of UL grant DCI (j: an index for open loop parameter Po and a (up to 32 parameter value sets per cell), q_d: an index of a DL RS resource for PL (pathloss) measurement (measurement of up to 4 per cell), 1: a closed loop power control process index (up to 2 processes per cell)).

Hereinafter, MTRP eMBB will be described.

In the present disclosure, MTRP-eMBB means that multiple TRPs transmit other data (e.g., other TB) by using a different layer/time/frequency. A UE configured with a MTRP-eMBB transmission method is indicated multiple TCI states by DCI and the UE assumes that data received by using a QCL RS of each TCI state is different data.

Meanwhile, whether of MTRP URLLC transmission/reception or MTRP eMBB transmission/reception may be understood by a UE by separately classifying a RNTI for MTRP-URLLC and a RNTI for MTRP-eMBB and using them. In other words, when CRC masking of DCI is performed by using a RNTI for URLLC, a UE considers as URLLC transmission and when CRC masking of DCI is performed by using a RNTI for eMBB, a UE considers as eMBB transmission. Alternatively, a base station may configure MTRP URLLC transmission/reception or may configure MTRP eMBB transmission/reception to a UE through other new signaling.

In the description of the present disclosure, for convenience of a description, it is described by assuming cooperative transmission/reception between 2 TRPs, but it may be extended and applied in 3 or more multi-TRP environments and it may be also extended and applied in multi-panel environments (i.e., a TRP corresponds to a panel). A different TRP may be recognized by a UE as a different TCI state and when a UE receives/transmits data/DCI/UCI by using TCI state 1, it means that data/DCI/UCI is received/transmitted from/to TRP 1.

The methods proposed in the present disclosure may be utilized in a situation where MTRP cooperatively transmits a PDCCH (the same PDCCH is repetitively or partitively transmitted). In addition, the methods proposed in the present disclosure may be utilized even in a situation where MTRP cooperatively transmits a PDSCH or cooperatively receives a PUSCH/PUCCH.

In addition, in the present disclosure, when a plurality of base stations (i.e., MTRP) repetitively transmit the same PDCCH, it may mean the same DCI is transmitted by a plurality of PDCCH candidates and it means that a plurality of base stations repetitively transmit the same DCI. The same DCI may mean two DCI with the same DCI format/size/payload. Alternatively, although two DCI have a different payload, it may be considered the same DCI when a scheduling result is the same. For example, a TDRA (time domain resource allocation) field of DCI relatively determines a slot/symbol position of data and a slot/symbol position of A/N (ACK/NACK) based on a reception time of DCI, and if DCI received at a time of n and DCI received at a time of n+1 represent the same scheduling result to UE, a TDRA field of two DCI is different, and consequentially, a DCI payload is different. R, the number of repetitions, may be directly indicated or mutually promised by a base station to UE. Alternatively, although a payload of two DCI is different and a scheduling result is not the same, it may be considered the same DCI when a scheduling result of one DCI is a subset of a scheduling result of other DCI. For example, when the same data is repetitively transmitted N times through TDM, DCI 1 received before first data indicates N data repetitions and DCI 2 received after first data and before second data indicates N−1 data repetitions. Scheduling data of DCI 2 becomes a subset of scheduling data of DCI 1 and two DCI is scheduling for the same data, so in this case, it may be considered the same DCI.

In addition, in the present disclosure, when a plurality of base stations (i.e., MTRP) partitively transmit the same PDCCH, it means that one DCI is transmitted by one PDCCH candidate and some resources that that PDCCH candidate is defined are transmitted by TRP 1 and remaining resources are transmitted by TRP 2.

In addition, in the present disclosure, when a UE repetitively transmits the same PUSCH so that a plurality of base stations (i.e., MTRP) can receive it, it may mean that the same data is transmitted by a plurality of PUSCHs. Here, each PUSCH may be optimized for an UL channel of a different TRP and transmitted. For example, when a UE repetitively transmits the same data through PUSCH 1 and 2, PUSCH 1 is transmitted by using UL TCI state 1 for TRP 1, and a value which is optimized for a channel of TRP 1 may also be scheduled/applied for link adaptation such as a precoder/MCS, etc. PUSCH 2 is transmitted by using UL TCI state 2 for TRP 2, and a value which is optimized for a channel of TRP 2 may also be scheduled/applied for link adaptation such as a precoder/MCS, etc. Here, PUSCH 1 and 2 which are repetitively transmitted may be transmitted at a different time to be time division multiplexed (TDM), frequency division multiplexed (FDM), spatial division multiplexed (SDM).

In addition, in the present disclosure, when a UE partitively transmits the same PUSCH so that a plurality of base stations (i.e., MTRP) will receive it, it means that one data is transmitted by one PUSCH, but a resource allocated to the PUSCH may be divided to optimize and transmit it for UL channels of different TRPs. For example, a UE transmits the same data through 10 symbol PUSCHs, data may be transmitted in 5 previous symbols by using UL TCI state 1 for TRP 1, and a value which is optimized for a channel of TRP 1 may be scheduled/applied for link adaptation such as a precoder/MCS, etc. The remaining data may be transmitted in the remaining 5 symbols by using UL TCI state 2 for TRP 2, and a value which is optimized for a channel of TRP 2 may be scheduled/applied for link adaptation such as a precoder/MCS, etc. In the example, transmission for TRP 1 and transmission for TRP 2 are time division multiplexed (TDM) by dividing one PUSCH into time resources, but it may be transmitted by other FDM/SDM method.

Similar to PUSCH transmission described above, a UE may repetitively transmit or partitively transmit the same PUCCH so that a plurality of base stations (i.e., MTRP) can receive the PUCCH.

A proposal of the present disclosure may be extended and applied to a variety of channels such as a PUSCH/PUCCH/PDSCH/PDCCH, etc.

In the existing NR system, a UE may repeatedly transmit the same PUSCH several times on the assumption that one base station (i.e., single-TRP (STRP)) receives.

Here, the same PUSCH may mean a PUSCH scheduled by one UL grant (or a configured grant by RRC signaling). Alternatively, it may mean a PUSCH carrying the same TB.

The PUSCH repetition transmission scheme may be divided into slot level PUSCH repetition (this is referred to as PUSCH repetition type A) in which only one repetition is included in one slot and the same PUSCH is repeatedly transmitted in continuous slots and symbol level PUSCH repetition (this is referred to as PUSCH repetition type B) in which two or more repetitions are included in one slot.

For PUSCH repetition type A, intra-slot frequency hopping or inter-slot frequency hopping may be configured. In the case of inter-slot frequency hopping, frequency hopping is performed at a slot boundary. In the case of intra-slot frequency hopping, the number of symbols in a first hop and the number of symbols in a second hop are configured by the base station, and frequency hopping is performed at the configured symbol boundary.

For PUSCH repetition type B, inter-repetition frequency hopping or inter-slot frequency hopping may be configured. In the case of inter-repetition frequency hopping, frequency hopping is applied for each nominal number of repetitions. Here, the nominal number of repetitions means the number of repetitions indicated by RRC signaling, etc., and substantially when one repetition crosses (includes) a slot boundary (or DL/UL switching point), the one repetition before and after the slot boundary (or DL/UL switching point) is divided into two, so the actual number of repetitions may be greater than the nominal number of repetitions. In the case of inter-slot frequency hopping, frequency hopping is performed at the slot boundary.

PUSCH repetition type A or B may be configured in a UE by higher layer signaling (e.g., RRC/MAC CE) or dynamic signaling (e.g., DCI). In addition, the above-described frequency hopping scheme may also be configured in a UE by higher layer signaling (e.g., RRC/MAC CE) or dynamic signaling (e.g., DCI).

Embodiment 1

Under the assumption that one base station (i.e., STRP) receives in the existing NR system, a UE may repeatedly transmit the same PUSCH in several slots. This is referred to as slot level PUSCH repetition. Here, inter-slot hopping is applied (enable). The PUSCH transmitted N times is transmitted in a scheduled resource block (RB) (scheduled through frequency domain resource allocation (FDRA) of DCI) in case of odd-numbered transmission, and an RB is determined according to a frequency hopping equation based on the scheduled RB (scheduled through the FDRA of DCI) in even-numbered transmission. That is, while the PUSCH is repeatedly transmitted, a non-hopping RB and a hopping RB are alternately applied. As a result, when one TRP receives N PUSCHs, a frequency diversity gain can be obtained.

However, if this inter-slot hopping scheme is applied as it is when a UE repeatedly transmits the same PUSCH to be received by a plurality of base stations (i.e., multi-TRP (MTRP)), frequency diversity cannot be obtained. For example, when the same PUSCH is repeatedly transmitted in slots 1,2,3,4 (that is, the same PUSCH is transmitted N=4 times), PUSCHs 1 and 3 may be transmitted to TRP 1 by using UL TCI state 1 for TRP 1 and by applying a scheduled value optimized for a channel of TRP 1 for link adaptation such as precoder/MCS, etc., PUSCHs 2 and 4 may be transmitted to TRP 2 by using UL TCI state 2 for TRP 2 and by applying a scheduled value optimized for a channel of TRP 2 for link adaptation such as precoder/MCS, etc. Here, if the existing inter-slot hopping scheme is applied as it is, non-hopping RB is allocated to PUSCHs 1 and 3 and hopping RB is allocated to PUSCHs 2 and 4. As a result, TRP 1 receiving PUSCHs 1 and 3 cannot obtain a frequency diversity gain due to hopping, and TRP 2 cannot obtain a frequency diversity gain due to hopping either. In order to obtain a frequency diversity gain for one TRP through hopping, the following method is proposed.

Embodiment 1-1) PUSCHs using the same UL TCI state among repeatedly transmitted PUSCHs may be grouped and the existing inter-slot hopping scheme may be applied to each PUSCH group. In other words, PUSCHs transmitted with the same TRP may be grouped and the inter-slot hopping scheme may be applied within each PUSCH group.

Figure 8:
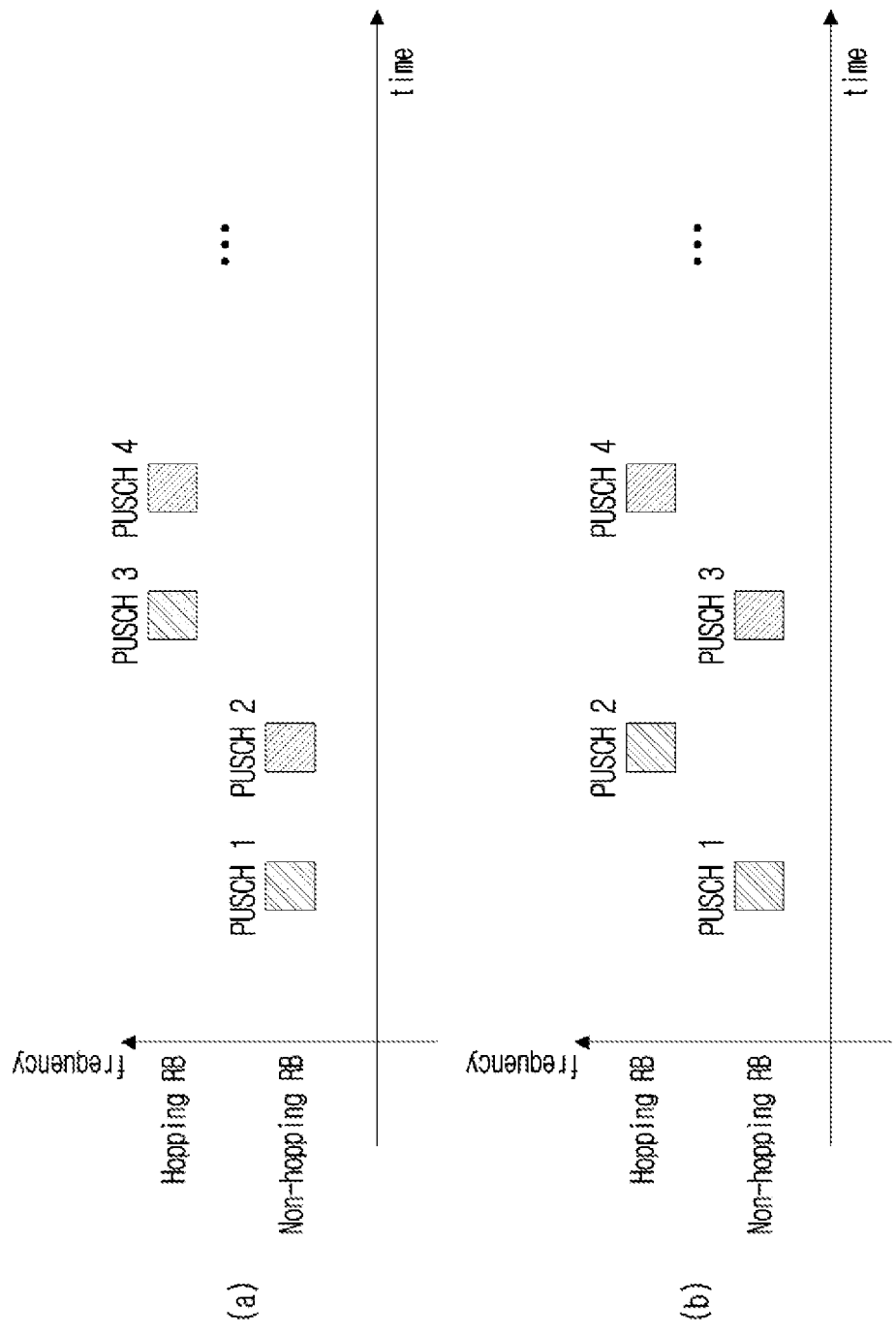
FIG. 8 is a diagram which illustrates a method of repeated transmission of an uplink channel according to an embodiment of the present disclosure.

FIG. 8 is a diagram which illustrates a method of repeated transmission of an uplink channel according to an embodiment of the present disclosure.

In FIG. 8, a case in which a UE repeatedly transmits a PUSCH is exemplified for convenience of description, but the embodiment of FIG. 8 may be equivalently applied to a case of repeatedly transmitting a PUCCH.

In FIG. 8, a case in which the UE repeatedly transmits the PUSCH 4 times is mainly described for convenience of description, but the repetition number of times is not limited to 4 in a method proposed in the present disclosure. In FIG. 8, each block represents each PUSCH TO (transmission occasion), and one or more resource blocks may be allocated to each PUSCH TO in a frequency domain. As an example, FIG. 8 may correspond to an example of PUSCH repetition type A in which inter-slot frequency hopping is configured or PUSCH repetition type B in which inter-repetition frequency hopping is configured.

Referring to FIG. 8(*a*), it is assumed that a UE repeatedly transmits PUSCH 4 times, PUSCH 1 and 3 use UL TCI state 1 for TRP 1, and PUSCH 2, 4 use UL TCI state 2 for TRP 2.

In this case, PUSCHs 1 and 3 may be grouped into one group, and PUSCHs 2 and 4 may be grouped into another group. It can be understood that a UE repeatedly transmits the same PUSCH in several slots on the assumption that one base station (i.e., STRP) receives each PUSCH group, and therefore the existing hopping scheme may be applied to each PUSCH group. That is, frequency hopping may be applied whenever a transmission occasion (TO) increases among PUSCHs included in a PUSCH group.

Assuming that the same PUSCH is transmitted twice for PUSCHs 1 and 3 in FIG. 8(*a*) and a frequency hopping scheme is applied, a non-hopping RB may be allocated to PUSCH 1, and a hopping RB may be allocated to PUSCH 3. Or vice versa. Similarly, a non-hopping RB may be allocated to PUSCH 2, and a hopping RB may be allocated to PUSCH 4. As a result, a non-hopping RB, a non-hopping RB, a hopping RB, and a hopping RB may be allocated to PUSCHs 1, 2, 3, and 4, respectively. A plurality of PUSCHs received by each TRP are transmitted through a hopping RB and a non-hopping RB. That is, TRP 1 may receive PUSCH 1 in a non-hopping RB and PUSCH 3 in a hopping RB, and TRP 2 may receive PUSCH 2 in a non-hopping RB and PUSCH 4 in a hopping RB.

Embodiment 1-2) Unlike this, the existing inter-slot hopping scheme is applied as it is, but a method of changing the PUSCH TO (transmission occasion) and UL TCI state mapping may be used.

Referring to FIG. 8(*b*), when a UE repeatedly transmits a PUSCH 4 times, the UE transmits the same PUSCH 4 times and the existing inter-slot hopping scheme is applied (that is, a scheme in which frequency hopping is applied at each slot boundary or each increment of TO), non-hopping RB may be allocated to PUSCHs 1 and 3 and hopping RB may be allocated to PUSCHs 2 and 4. Here, PUSCHs 1, 2, 3, and 4 mean PUSCH TO, respectively.

Here, a UL TCI state to be used for each PUSCH TO is not sequentially mapped in a circular manner, and consecutive TOs may be mapped to the same UL TCI state. For example, UL TCI state 1 is not mapped to PUSCHs 1 and 3, UL TCI state 2 is not mapped to PUSCHs 2 and 4, and UL TCI state 1 (i.e., TRP 1) is mapped to PUSCHs 1 and 2, UL TCI state 2 (i.e., TRP 1) may be mapped to PUSCHs 3 and 4.

To generalize this, when mapping M UL TCI states for N TOs, a first UL TCI state is mapped for consecutive floor (N/M) (floor (x) is the largest integer not greater than x) or ceil (N/M) (ceil(x) is the smallest integer not less than x) TOs, a second UL TCI state is mapped for the next consecutive floor (N/M) or ceil (N/M) TOs, and a third UL TCI state is mapped for the next consecutive floor (N/M) or ceil (N/M) TOs, and in this way, it may be mapped up to the M-th UL TCI state. If, after mapping in the above manner, there are more TOs, the method of mapping a first UL TCI state for consecutive TOs may be repeated. As a result, in FIG. 8(*b*), since PUSCHs 1, 2, 3, and 4 are allocated non-hopping RB, hopping RB, non-hopping RB, and hopping RB, respectively, and transmitted to TRP 1, TRP 1, TRP 2, and TRP 2, respectively, the plurality of PUSCHs received by each TRP are transmitted through the hopping RB and the non-hopping RB.

In the above description, a mapping method between a PUSCH TO and a UL TCI state may be divided into a sequential mapping method and a group mapping method. The sequential mapping method is a method of sequentially mapping the UL TCI state as the PUSCH TO increases in a circular manner. In the group mapping method, several consecutive TOs are configured as a group, the TOs included in each group are mapped to the same UL TCI state, and as the TO group increases, the UL TCI state is mapped sequentially and circularly. Here, in consideration of the possibility that PUSCH frequency hopping is enabled, in repeated PUSCH transmission for M-TRP (regardless of whether the hopping is enabled (or configured)/disabled (or not configured)), only the group mapping method may be supported. That is, when repeated PUSCH transmission is configured in a UE, only the group mapping method may always be supported. Whether to repeatedly transmit PUSCH may be configured by higher layer signaling (e.g., RRC signaling).

Alternatively, when frequency hopping is enabled (or configured), the group mapping method may be used, and when it is disabled (or not configured), the sequential mapping method may be used. Or, vice versa. That is, when frequency hopping is enabled (or configured), the sequential mapping method may be used, and when it is disabled (or not set), the group mapping method may be used. Alternatively, when hopping is disabled (or not configured), both mapping methods may be used, and the base station may indicate which method to use. However, when hopping is enabled (or configured), only the group mapping method is used.

The above-described proposed method may be extended and applied even when hopping between PUSCH TOs (i.e., inter-repetition frequency hopping or inter-TO frequency hopping) is configured in symbol level PUSCH repetition. For example, when a PUSCH of 4 symbols is repeatedly transmitted 4 times, but each PUSCH is transmitted consecutively in adjacent OFDM symbols instead of in different slots (in this case, n symbol gaps may exist between PUSCH TOs), this may be referred to as symbol level PUSCH repetition. Here, when frequency hopping between TOs is applied to PUSCH TO 1, 2, 3, and 4, non-hopping RB, hopping RB, non-hopping RB, and hopping RB are alternately allocated to TO 1,2,3,4, respectively. In this case, the above proposed methods (i.e., embodiments 1-1 and 1-2) may be applied. That is, as in embodiment 1-1, TOs to which the same TCI state is mapped may be grouped, and non-hopping RBs and hopping RBs may be alternately applied for each TO. In the example of FIG. 8(*a*) above, PUSCHs 1 and 3 are grouped, PUSCHs 2 and 4 are grouped, and for each group, hopping between PUSCH TOs (i.e., inter-repetition frequency hopping or inter-TO frequency hopping) belonging to a corresponding group may be applied. In addition, as in embodiment 1-2 above, hopping (i.e., inter-repetition frequency hopping or inter-TO frequency hopping) is applied between all repeated PUSCH TOs, but adjacent TOs may be grouped and mapped to the same TCI state. In the example of FIG. 8(b) above, frequency hopping is applied to PUSCHs 1, 2, 3, and 4, PUSCHs 1 and 2 are grouped, PUSCHs 2 and 4 are grouped, and different TCI states may be mapped to each group.

Embodiment 2

When inter-slot hopping is applied in symbol level PUSCH repetition, PUSCHs transmitted in odd-numbered (e.g., first) slots are transmitted in a non-hopping RB, and PUSCHs transmitted in even-numbered (e.g., second) slots may be transmitted in a hopping RB. For example, when PUSCH TO 1, 2, 3, and 4 are configured, PUSCH TO 1 and 2 may be transmitted in a non-hopping RB in slot 1, and PUSCH TO 3, 4 may be transmitted in a hopping RB in slot 2. Here, when TCI states 1, 2, 1, and 2 are mapped to PUSCH TO 1, 2, 3, and 4, respectively, the TOs of PUSCHs mapped to the same TCI state are non-contiguous, and the RB s allocated by hopping are different, therefore, the channel estimation performance is deteriorated.

Embodiment 2-1) In order to solve the above problem, the PUSCH TO transmitted in the same slot may be mapped to the same TCI state by mapping the TCI state in units of slots.

Figure 9:
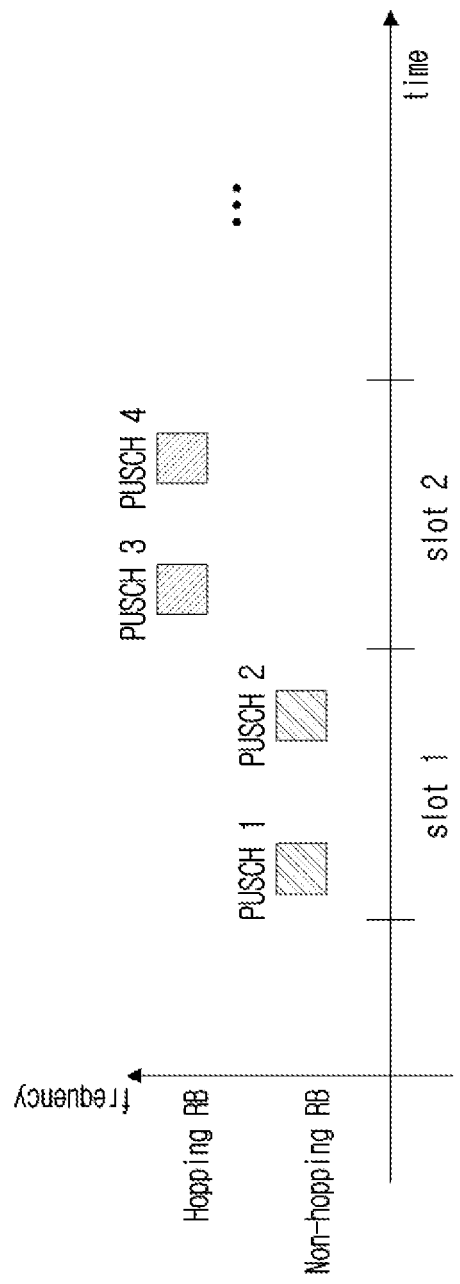
FIG. 9 is a diagram which illustrates a method of repeated transmission of an uplink channel according to an embodiment of the present disclosure.

FIG. 9 is a diagram which illustrates a method of repeated transmission of an uplink channel according to an embodiment of the present disclosure.

In FIG. 9, a case in which a UE repeatedly transmits a PUSCH is exemplified for convenience of description, but the embodiment of FIG. 9 may be equivalently applied to a case of repeatedly transmitting a PUCCH.

In FIG. 9, a case in which the UE repeatedly transmits the PUSCH 4 times is mainly described for convenience of description, but the repetition number of times is not limited to 4 in a method proposed in the present disclosure. In FIG. 9, each block represents each PUSCH TO (transmission occasion), and one or more resource blocks may be allocated to each PUSCH TO in a frequency domain. As an example, FIG. 9 may correspond to an example of PUSCH repetition type A in which inter-slot frequency hopping is configured or PUSCH repetition type B in which inter-repetition frequency hopping is configured.

Referring to FIG. 9, PUSCH TOs 1 and 2 transmitted in slot 1 may be mapped to TCI state 1, and PUSCH TOs 3 and 4 transmitted in slot 2 may be mapped to TCI state 2. As a result, a base station (i.e., TRP) that has received PUSCH TOs 1 and 2 in slot 1 may increase channel estimation accuracy by using a DMRS of PUSCH TOs 1 and 2 together. Similarly, a base station (i.e., TRP) that has received PUSCH TOs 3 and 4 in slot 2 may increase channel estimation accuracy by using a DMRS of PUSCH TOs 3 and 4 together.

A base station may inform a UE of a plurality of UL TCI states (i.e., TCI state set) used for repetitive PUSCH transmission through higher layer signaling (e.g., RRC/MAC CE level). When transmitting a symbol level PUSCH in one slot (i.e., for all PUSCH TOs transmitted in one slot), the UE repeatedly transmits the PUSCH using one UL TCI state. When a PUSCH is transmitted over N slots, the UL TCI states may be sequentially mapped as the number of slots increases (for example, when three UL TCI states are configured, UL TCI state 1 to slot 1, UL TCI state 2 to slot 2, UL TCI state 3 to slot 3, and UL TCI state 4 to slot 4 may be mapped, and UL TCI state may be mapped to subsequent slots in the same manner). Alternatively, slots transmitted in the same frequency resource among N slots may be grouped (for example, odd-numbered slots are in a first group, and even-numbered slots are in a second group), and the UL TCI states may be sequentially and circularly mapped to each group (for example, UL TCI state 1 to slot 1, UL TCI state 2 to slot 3, UL TCI state 3 to slot 5 in a first group may be mapped, and UL TCI state 1 to slot 2, UL TCI state 2 to slot 4, UL TCI state 3 to slot 6 in a second group may be mapped. The UL TCI state may be mapped to subsequent slots in the same manner). As a result, the repetitive PUSCH received by one TRP uses both hopping and non-hopping RB s.

As one method of higher layer signaling (e.g., RRC/MAC CE level) to the UE a plurality of UL TCI states (i.e., TCI state set) used for repetitive PUSCH transmission, a plurality of UL TCI states (i.e., TCI state set) may be configured within configuration of CORESET in which DCI for scheduling a PUSCH (for activating of a PUSCH in case of a grant free PUSCH) is received. If the number of repeated PUSCH transmissions is dynamically indicated/determined (e.g., by DCI), a UL TCI state used for corresponding PUSCH transmission may be dynamically determined within the TCI state set (that is, not all UL TCI states may be used in the UL TCI state set). For example, if the number of repeated transmissions is small and all PUSCH TOs are transmitted within one slot, only a first TCI state in the TCI state set may be used. If the number of repeated transmissions is large and all PUSCH TOs are transmitted in N slots, a first TCI state of the TCI state set to the N-th TCI state may be used. If the number T of TCI states in the TCI state set is less than N (the number of repeated transmissions), all of the TCI states from a first TCI state to the T-th TCI state are used, and as the slots increase, the TCI state is circulated and sequentially can be mapped.

Embodiment 2-2) Various hopping patterns are being discussed in addition to inter slot hopping in symbol level PUSCH repetition. A problem similar to the above-mentioned problem may occur for various hopping patterns, and a more general solution is proposed to solve this problem.

As mentioned in the above problem, when the TOs of the PUSCH mapped to the same TCI state are continuous and the allocated RBs are the same, the channel estimation performance can be improved. Therefore, to generalize this, if the TOs of the PUSCH are continuous and the allocated RBs are the same, the TOs are configured as one group (that is, one group can be regarded as one hop), and as the group increases, the TCI state may be mapped sequentially and circularly. That is, the i-th TCI state is mapped to the i-th group, and the same TCI state is mapped to PUSCH TOs in the same group. Alternatively, a base station may directly configure such a TO group (i.e., a group for PUSCH TOs to which the same TCI state is mapped) to a UE.

For example, if non-hopping RB, non-hopping RB, hopping RB, and hopping RB are allocated to PUSCH TOs 1, 2, 3, and 4 when the same PUSCH is transmitted 4 times, TOs 1 and 2 may be configured as one group, TOs 3 and 4 may be configured as another group. In addition, if a plurality of UL TCI states used for repetitive PUSCH transmission are configured as TCI states 1 and 2, TCI state 1 may be used in PUSCH TOs 1 and 2 (i.e., group 1), and TCI state 2 may be used in PUSCH TOs 2, 3 (i.e., group 2). Referring again to FIG. 9, although embodiment 2-2 has the same results as embodiment 2-1, embodiment 2-2 is different from embodiment 2-1 in that it does not consider a slot boundary.

As another example, if non-hopping RB, hopping RB, non-hopping RB, and hopping RB are allocated to PUSCH TOs 1, 2, 3, 4, respectively, since RBs are different between consecutive PUSCH TOs, PUSCH TOs 1, 2, 3, 4 may be configured as different groups, respectively. If a plurality of UL TCI states used for repetitive PUSCH transmission are configured as TCI states 1 and 2, TCI states 1, 2, 1, 2 may be used in PUSCH TO 1, 2, 3, 4, respectively.

In the above-described proposed method (i.e., embodiments 1 and 2), repeated transmission for PUSCH has been mainly described for convenience of description, but the present disclosure is not limited thereto. That is, by replacing the repeated transmission of the PUSCH with the repeated transmission of a PUCCH in the above-described proposed method, even when inter-slot hopping/inter-TO hopping/intra-slot hopping is used when the PUCCH is repeatedly transmitted, the above-described proposed method may be applied.

Figure 10:
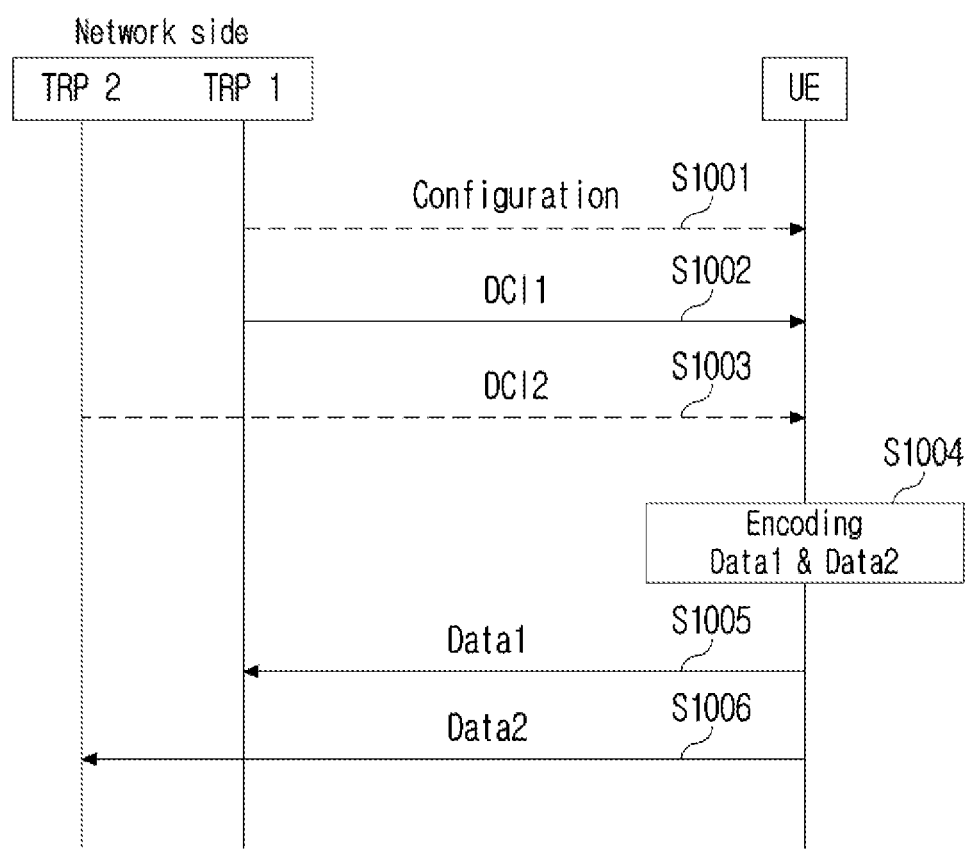
FIG. 10 is a diagram which illustrates a method of repeated transmission of an uplink channel according to an embodiment of the present disclosure.

FIG. 10 is a diagram which illustrates a method of repeated transmission of an uplink channel according to an embodiment of the present disclosure.

FIG. 10 represents an example of signaling between a network side (e.g., TRP 1, TRP 2) and a UE in a situation of multiple TRP (that is, M-TRP or multiple cells, all TRPs in the present disclosure may be replaced with cells) to which the above-described embodiments (embodiments 1 and 2 described above) may be applied. In addition, all TRPs in the present disclosure may be replaced with cells. Alternatively, even when a plurality of CORESETs are configured from one TRP, each CORESET is regarded as a TRP and can be interpreted as M-TRP. Here, the UE/network is just one example and may be implemented in various devices. FIG. 10 illustrates a flowchart of signaling for convenience of description of the present disclosure, and does not limit the scope of the present disclosure. In addition, some of the step(s) illustrated in FIG. 10 may be omitted depending on circumstances and/or configurations.

In FIG. 10, signaling between two TRPs and a UE is exemplified for convenience of description, but of course, the signaling method may be extended and applied to signaling between multiple TRPs and multiple UEs. In the present disclosure, including the description below, the network side may be a plurality of base stations corresponding to each TRP, may be one base station including a plurality of TRPs, and may be one cell including a plurality of TRPs. In an example, ideal/non-ideal backhaul may be configured between TRP 1 and TRP 2 included in the Network side. In addition, the following description is described based on a plurality of TRPs, but it may be also equivalently extended and applied to transmission through a plurality of panels. In addition, in the present disclosure, an operation in which a terminal receives a signal from TRP1/TRP2 may be interpreted/described as an operation in which a terminal receives a signal from a network side (via/using TRP1/2) (or may be an operation), and an operation in which a terminal transmits a signal to TRP1/TRP2 may be interpreted/described as an operation in which a terminal transmits a signal to the network side (via/using TRP1/TRP2) (or may be an operation), and vice versa can also be interpreted/described.

Referring to FIG. 10, a UE may receive configuration information for multiple TRP-based transmission/reception through/using TRP 1 (and/or TRP 2) from a network side (S1001). The configuration information may include information related to the configuration of the network side (i.e., TRP configuration), resource information (resource allocation) related to multiple TRP-based transmission/reception, etc. In this case, the configuration information may be transmitted through higher layer signaling (e.g., RRC signaling, MAC-CE, etc.). In addition, when the configuration information is predefined or predetermined, step S1001 may be omitted.

For example, the configuration information may include configuration information related to the TCI state mapping method/scheme, TCI state related information (for example, TCI state set) related to repeated transmission of an uplink channel (e.g., PUSCH, PUCCH), etc. described in the above-described method (for example, embodiments 1-1 and 1-2 of embodiment 1, embodiments 2-1 and 2-2 of embodiment 2, etc.).

In addition, for example, the configuration information may include information related to configuration of a transmission occasion, information related to TCI state mapping, etc. described in the above-described method (for example, embodiments 1-1 and 1-2 of embodiment 1, embodiments 2-1 and 2-2 of embodiment 2, etc.).

In addition, the configuration information may include configuration information related to repeated transmission of an uplink channel (e.g., PUSCH, PUCCH). For example, the configuration information may include whether an uplink channel is repeatedly transmitted or not, a repetition transmission type (e.g., PUSCH repetition type A, PUSCH repetition type B), repetition number information, a symbol from which repetition starts, a length of repetition, etc.

In addition, the configuration information may include grouping information for TOs of an uplink channel. For example, when grouping TOs of an uplink channel mapped to the same TCI state as in embodiment 1-1 above, information indicating a grouping method and/or criteria (i.e., TCI state) for grouping TOs of an uplink channel may be included. As another example, when grouping consecutive TOs of an uplink channel as in embodiment 1-2 above, information indicating the grouping method and/or information on the number of grouped consecutive TOs of an uplink channel may be included. As another example, when TOs of an uplink channel are grouped in a predetermined time interval (e.g., slot) as in embodiment 1-3 above, information indicating the grouping method and/or information on a time interval (e.g., a slot) including grouped consecutive TOs of an uplink channel may be included. As another example, when grouping consecutive TOs of an uplink channel with the same RB as in embodiment 1-4 above, information indicating the grouping method and/or information on the number of grouped consecutive TOs of an uplink channel may be included.

In addition, the configuration information may include information about a TCI state set including a plurality of TCI states, as an example of TCI state related information related to repeated transmission of an uplink channel (e.g., PUSCH, PUCCH).

The configuration information may include information indicating whether a method of sequentially mapping a TCI state in a circular manner (i.e., a sequential mapping method) is applied whenever an order number of TO of an uplink channel increases, or a method of grouping a plurality of uplink channels in TO units according to a certain criterion and sequentially mapping a TCI state in a circular manner (i.e., a group mapping method) is applied whenever an order number of each group increases. Alternatively, any one of the sequential mapping method and the group mapping method is defined as a default and information indicating the corresponding method only when a method different from the defined method is applied may be included.

The operation that a UE (100/200 in FIG. 12) receives the configuration information related to the multiple TRP-based transmission and reception from a network side (200/100 in FIG. 12) of the step S1001 described above may be implemented by an apparatus of FIG. 12 to be described below. For example, referring to FIG. 12, one or more processors 102/202 may control one or more transceivers 106/206 and/or one or more memories 104/204 to receive the configuration information related to the multiple TRP-based transmission and reception, and one or more transceivers 106/206 may receive the configuration information related to the multiple TRP-based transmission and reception from a network side.

A UE may receive DCI 1 through/using TRP 1 from a network side (S1002). In addition, the UE may receive DCI 2 through/using TRP 2 from the network side (S1003). In the case of a multiple DCI-based MTRP operation, DCI 1 and DCI 2 may be received from TRP 1 and TRP 2, respectively.

Alternatively, in the case of a single DCI-based MTRP operation, one DCI including both information of DCI 1 and information of DCI 2 may be received from one of TRP 1 or TRP 2. In this case, the steps S1002 and S1003 may be integrated and performed. In addition, any one of steps S1002 and S1003 may be performed earlier than the other. The DCI (e.g., DCI 1 and DCI 2) may be transmitted through a control channel (e.g., PDCCH, etc.).

For example, the DCI 1 and the DCI 2 may include (indicative) information for a TCI state, resource allocation information (i.e., spatial/frequency/time resources) for DMRS and/or data, etc. described in the above-described method (for example, embodiments 1-1 and 1-2 of embodiment 1, embodiments 2-1 and 2-2 of embodiment 2, etc.). For example, the DCI 1 and the DCI 2 may include indication information related to a configuration of a transmission occasion (TO), information related to a mapping of a TO of an uplink channel and a TCI state (e.g., mapping order), etc.

The DCI 1 and the DCI 2 (or a single DCI) may include information related to repeated transmission of an uplink channel (e.g., PUSCH). For example, whether an uplink channel is repeatedly transmitted or not, a repetition transmission type (e.g., PUSCH repetition type A, PUSCH repetition type B), repetition number information, a symbol from which repetition starts, a length of repetition, etc. may be included.

In addition, the DCI 1 and the DCI 2 (or a single DCI) may include grouping information for TOs of an uplink channel. For example, when grouping TOs of an uplink channel mapped to the same TCI state as in embodiment 1-1 above, information indicating the grouping method and/or criteria (i.e., TCI state) for grouping TOs of an uplink channel may be included. As another example, when grouping consecutive TOs of an uplink channel as in embodiment 1-2 above, information indicating the grouping method and/or information on the number of grouped consecutive TOs of an uplink channel may be included. As another example, when TOs of an uplink channel are grouped in a predetermined time interval (e.g., slot) as in embodiment 1-3 above, information indicating the grouping method and/or information on a time interval (e.g., a slot) including grouped consecutive TOs of an uplink channel may be included. As another example, when grouping consecutive TOs of an uplink channel with the same RB as in embodiment 1-4 above, information indicating the grouping method and/or information on the number of grouped consecutive TOs of an uplink channel may be included.

In addition, the DCI 1 and the DCI 2 (or a single DCI) may include information indicating whether a sequential mapping method or a group mapping method is applied between an uplink TO (group) and a TCI state. Alternatively, any one of the sequential mapping method and the group mapping method is defined as a default and information indicating the corresponding method only when a method different from the defined method is applied may be included.

The operation that a UE (100/200 in FIG. 12) receives the DCI 1 and/or the DCI 2 from a network side (200/100 in FIG. 12) of the step S1002/S1003 described above may be implemented by an apparatus of FIG. 12 to be described below. For example, referring to FIG. 12, one or more processors 102/202 may control one or more transceivers 106/206 and/or one or more memories 104/204 to receive the DCI 1 and/or the DCI 2, and one or more transceivers 106/206 may receive the DCI 1 and/or the DCI 2 from a network side.

A UE may encode Data 1 and Data 2 to be transmitted to a network side (S1004). For example, the UE may perform to encode data based on the above-described method (for example, embodiments 1-1 and 1-2 of embodiment 1, embodiments 2-1 and 2-2 of embodiment 2, etc.). For example, data may be encoded by applying a configured/indicated TCI state mapping method.

The operation that a UE (100/200 in FIG. 12) encodes the Data 1 and the Data 2 of the step S1004 described above may be implemented by an apparatus of FIG. 12 to be described below. For example, referring to FIG. 12, one or more processors 102/202 may control one or more memories 104/204 and the like to perform an operation of encoding the Data 1 and the Data 2.

A UE may transmit Data 1 and/or Data 2 to a Network side through/using TRP 1 and/or TRP 2 (S1005, S1006). For example, the Data 1 and/or the Data 2 may be transmitted to a network side through a PUSCH. For example, the Data 1 and/or the Data 2 may be repeatedly transmitted through the same PUSCH. In this case, a frequency hopping method in units of inter slots (or symbols) may be applied. For example, as in embodiment 1-1 above, whenever a PUSCH TO increases, a TCI state may be sequentially mapped in a circular manner, PUSCH TOs using the same UL TCI state may be grouped, and frequency hopping for each PUSCH group may be applied. Alternatively, as in embodiment 1-2 above, frequency hopping may be applied at slot level, a predetermined number of consecutive PUSCH TOs may be grouped, and a TCI state may be sequentially mapped in a circular manner whenever a group (an order number of a group) increases. Alternatively, as in the embodiment 2-1 above, frequency hopping may be applied at slot level, PUSCH TOs transmitted in the same slot may be grouped, and a TCI state may be mapped sequentially in a circular manner whenever a slot (or group) is increased. Alternatively, as in the embodiment 2-2 above, frequency hopping may be applied at symbol level or repetition (TO) level, TOs of consecutive PUSCHs having the same assigned RB may be grouped, and a TCI state may be sequentially mapped in a circular manner whenever a group (an order number of a group) increases.

The operation that a UE (100/200 in FIG. 12) transmits the Data 1 and/or the Data 2 to a network side (200/100 in FIG. 12) of the step S1005/S1006 described above may be implemented by an apparatus of FIG. 12 to be described below. For example, referring to FIG. 12, one or more processors 102/202 may control one or more transceivers 106/206 and/or one or more memories 104/204 to transmit the Data 1 and/or the Data 2, and one or more transceivers 106/206 may transmit the Data 1 and/or the Data 2 to a network side.

As mentioned above, the above-described signaling between a Network side and a UE and related operations (e.g., embodiments 1-1 and 1-2 of embodiment 1, embodiments 2-1 and 2-2 of embodiment 2, etc.) may be implemented by an apparatus to be described with reference to FIG. 12. For example, a network side (e.g., TRP 1/TRP 2) may correspond to a first wireless device, a UE may correspond to a second wireless device, or vice versa.

Figure 12:
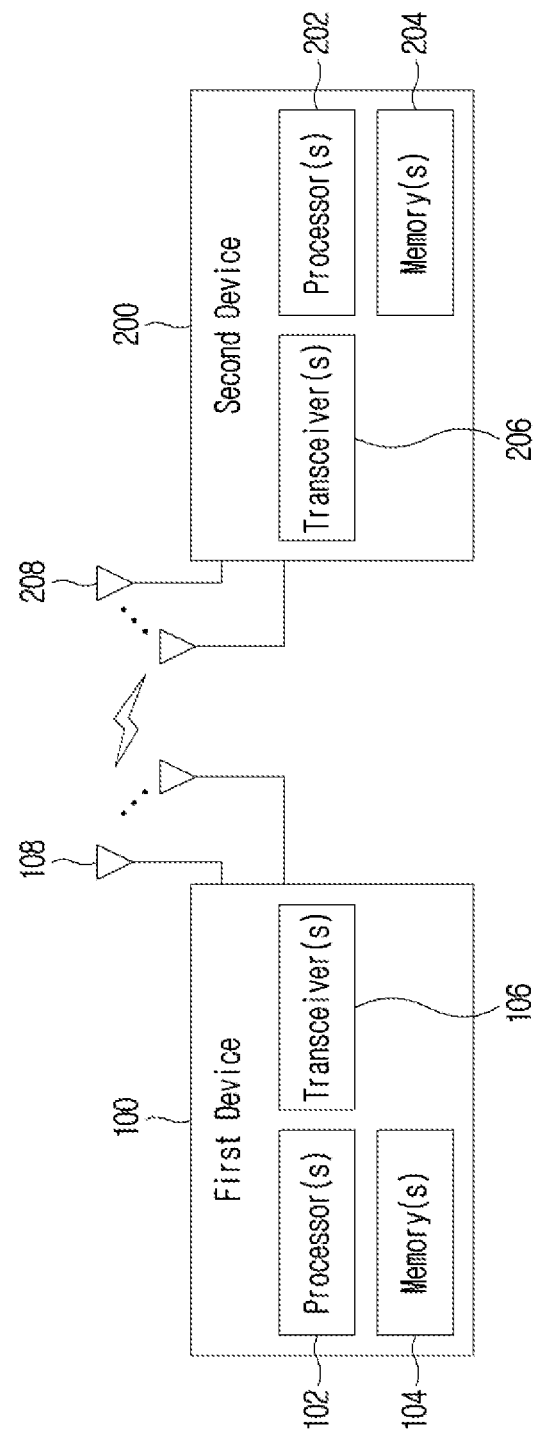
FIG. 12 is a diagram which illustrates a block diagram of a wireless communication system according to an embodiment of the present disclosure.

For example, the above-described signaling between a Network side and a UE and related operations (e.g., embodiments 1-1 and 1-2 of embodiment 1, embodiments 2-1 and 2-2 of embodiment 2, etc.) may be processed by one or more processors 102 and 202 of FIG. 12, and the above-described signaling between a Network side and a UE and related operations (e.g., embodiments 1-1 and 1-2 of embodiment 1, embodiments 2-1 and 2-2 of embodiment 2, etc.) may be stored in one or more memories 104 and 204 of FIG. 12 in a form of instructions/programs (e.g., instruction, executable code) for driving at least one processor 102, 202 of FIG. 12.

Figure 11:
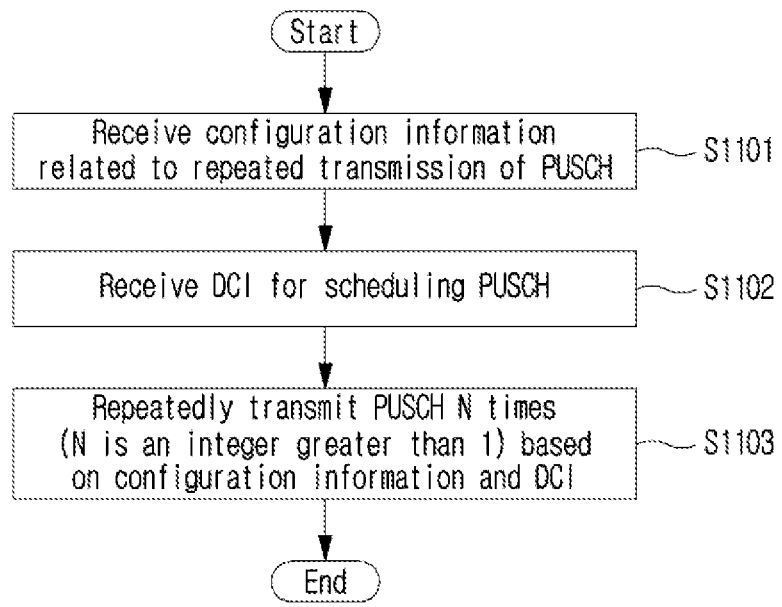
FIG. 11 is a diagram which illustrates a method of repeated transmission of an uplink channel according to an embodiment of the present disclosure.

FIG. 11 is a diagram which illustrates a method of repeated transmission of an uplink channel according to an embodiment of the present disclosure.

FIG. 11 exemplifies and describes only a case where an uplink channel is a PUSCH for convenience of description, but the present disclosure is not limited thereto. For example, even when an uplink channel is a PUCCH, the method described below may be applied in the same manner except that step S1101 of FIG. 11 is omitted, and in this case, a PUSCH may be replaced with a PUCCH in the description to be described below.

The procedure illustrated in FIG. 11 may be implemented by an apparatus 100/200 illustrated in FIG. 12 to be described below.

Referring to FIG. 11, a terminal receives configuration information related to repeated transmission of a PUSCH (S1101).

As described above, when the embodiment of FIG. 11 is applied to repeated transmission of a PUCCH, a terminal may receive configuration information related to repeated transmission of a PUCCH instead of configuration information related to repeated transmission of a PUSCH in step S1101.

A terminal may receive configuration information from a TRP. For example, a TRP may correspond to a base station, a cell, etc. as described above.

The configuration information may include resource information (resource allocation) related to multiple TRP-based transmission/reception, etc. In this case, the configuration information may be transmitted through higher layer signaling (e.g., RRC signaling, MAC-CE, etc.). In addition, when the configuration information is predefined or predetermined, step S1101 may be omitted.

For example, the configuration information may include configuration information related to the TCI state mapping method/scheme, TCI state related information (for example, TCI state set) related to repeated transmission of an uplink channel (e.g., PUSCH, PUCCH), etc. described in the above-described method (for example, embodiments 1-1 and 1-2 of embodiment 1, embodiments 2-1 and 2-2 of embodiment 2, etc.).

In addition, for example, the configuration information may include information related to configuration of a transmission occasion, information related to TCI state mapping, etc. described in the above-described method (for example, embodiments 1-1 and 1-2 of embodiment 1, embodiments 2-1 and 2-2 of embodiment 2, etc.).

In addition, the configuration information may include configuration information related to repeated transmission of an uplink channel (e.g., PUSCH, PUCCH). For example, the configuration information may include whether an uplink channel is repeatedly transmitted or not, a repetition transmission type (e.g., PUSCH repetition type A, PUSCH repetition type B), repetition number information, a symbol from which repetition starts, a length of repetition, etc.

In addition, the configuration information may include grouping information for TOs of an uplink channel. For example, when grouping TOs of an uplink channel mapped to the same TCI state as in embodiment 1-1 above, information indicating the grouping method and/or criteria (i.e., TCI state) for grouping TOs of an uplink channel may be included. As another example, when grouping consecutive TOs of an uplink channel as in embodiment 1-2 above, information indicating the grouping method and/or information on the number of grouped consecutive TOs of an uplink channel may be included. As another example, when TOs of an uplink channel are grouped in a predetermined time interval (e.g., slot) as in embodiment 1-3 above, information indicating the grouping method and/or information on a time interval (e.g., a slot) including grouped consecutive TOs of an uplink channel may be included. As another example, when grouping consecutive TOs of an uplink channel with the same RB as in embodiment 1-4 above, information indicating the grouping method and/or information on the number of grouped consecutive TOs of an uplink channel may be included.

In addition, the configuration information may include information about a TCI state set including a plurality of TCI states, as an example of TCI state related information related to repeated transmission of an uplink channel (e.g., PUSCH, PUCCH).

The configuration information may include information indicating whether a method of sequentially mapping a TCI state in a circular manner is applied whenever an order number of TO of an uplink channel increases (i.e., a sequential mapping method), or a method of grouping a plurality of uplink channels in TO units according to a certain criterion and sequentially mapping a TCI state in a circular manner is applied whenever an order number of each group increases (i.e., a group mapping method). Alternatively, any one of the sequential mapping method and the group mapping method is defined as a default and information indicating the corresponding method only when a method different from the defined method is applied may be included.

A terminal receives DCI for scheduling a PUSCH (S1102).

As described above, when the embodiment of FIG. 11 is applied to repeated transmission of a PUCCH, step S1102 may be omitted.

The terminal may receive the DCI from a TRP. For example, the TRP may correspond to a base station, a cell, etc. as described above.

In step S1102, for convenience of explanation, only reception of one DCI is exemplified, but the present disclosure is not limited thereto. That is, the terminal may receive each DCI from multiple TRPs. In this case, information included in DCI to be described below may mean information obtained by merging each DCI received from multiple TRPs.

The DCI may be carried over a control channel (e.g., PDCCH, etc.).

The DCI may include (indicative) information for a TCI state, resource allocation information (i.e., spatial/frequency/time resources) for DMRS and/or data, etc.

described in the above-described method (for example, embodiments 1-1 and 1-2 of embodiment 1, embodiments 2-1 and 2-2 of embodiment 2, etc.). For example, the DCI may include indication information related to a configuration of a transmission occasion (TO), information related to a mapping of a TO of an uplink channel and a TCI state (e.g., mapping order), etc.

The DCI may include information related to repeated transmission of an uplink channel (e.g., PUSCH). For example, whether an uplink channel is repeatedly transmitted or not, a repetition transmission type (e.g., PUSCH repetition type A, PUSCH repetition type B), repetition number information, a symbol from which repetition starts, a length of repetition, etc. may be included.

In addition, the DCI may include grouping information for TOs of an uplink channel. For example, when grouping TOs of an uplink channel mapped to the same TCI state as in embodiment 1-1 above, information indicating the grouping method and/or criteria (i.e., TCI state) for grouping TOs of an uplink channel may be included. As another example, when grouping consecutive TOs of an uplink channel as in embodiment 1-2 above, information indicating the grouping method and/or information on the number of grouped consecutive TOs of an uplink channel may be included. As another example, when TOs of an uplink channel are grouped in a predetermined time interval (e.g., slot) as in embodiment 1-3 above, information indicating the grouping method and/or information on a time interval (e.g., a slot) including grouped consecutive TOs of an uplink channel may be included. As another example, when grouping consecutive TOs of an uplink channel with the same RB as in embodiment 1-4 above, information indicating the grouping method and/or information on the number of grouped consecutive TOs of an uplink channel may be included.

In addition, the DCI may include information indicating whether a sequential mapping method or a group mapping method is applied between an uplink TO (group) and a TCI state. Alternatively, any one of the sequential mapping method and the group mapping method is defined as a default and information indicating the corresponding method only when a method different from the defined method is applied may be included.

A terminal repeatedly transmits the PUSCH N times (N is an integer greater than 1) based on the configuration information received in step S1101 and the DCI received in step S1102 (S1103).

As described above, when the embodiment of FIG. 11 is applied to repeated transmission of PUCCH, the terminal may perform repeated transmission of PUCCH instead of repeated transmission of PUSCH in step S1103.

The terminal may transmit a PUSCH to multiple TRPs. For example, the TRP may correspond to a base station, a cell, etc. as described above.

As in the embodiment 1-1 above, a plurality of transmission configuration indicator (TCI) states may be sequentially and circularly mapped to the N PUSCHs in an ascending order. In addition, each of PUSCHs to which identical TCI is mapped may be grouped into M PUSCH groups (N is an integer greater than 1). In addition, frequency hopping may be applied to the M PUSCH groups individually.

In this case, the N PUSCHs are transmitted repeatedly in N slots by transmitting one PUSCH in one slot, and frequency hopping may be applied at a slot level.

In addition, the N PUSCHs are transmitted in units of a plurality of symbols, and the frequency hopping may be applied for each transmission occasion of the N number of PUSCHs. In this case, a symbol gap may exist between adjacent PUSCHs in the N PUSCHs.

In addition, the M PUSCH groups may be transmitted to different transmission reception points (TRPs) using the TCI state mapped to each group. In this case, the M PUSCH groups may be transmitted by applying a precoder and a modulation and coding scheme (MCS) based on a channel of each TRP.

Alternatively, as in the embodiment 1-2 above, frequency hopping may be applied to the N PUSCHs. In this case, the frequency hopping may be applied at a slot level or per PUSCH TO. In addition, each of a predetermined number of consecutively transmitted PUSCHs in the N PUSCHs may be grouped into M PUSCH groups (N is an integer greater than 1). In addition, a plurality of transmission configuration indicator (TCI) states may be sequentially and circularly mapped to the M PUSCH groups in an ascending order.

Alternatively, as in embodiments 1-3, frequency hopping may be applied to the N PUSCHs at the slot level. In addition, each PUSCH transmitted in the same slot may be grouped into M PUSCH groups (N is an integer greater than 1). In addition, a plurality of transmission configuration indicator (TCI) states may be sequentially and circularly mapped to the M PUSCH groups in an ascending order.

Alternatively, as in embodiments 1-4, frequency hopping may be applied to N PUSCHs. In this case, the frequency hopping may be applied at a slot level or per PUSCH TO. In addition, each of predetermined number of consecutive PUSCHs to which the same resource block (RB) is allocated may be grouped into M (N is an integer greater than 1) PUSCH groups. In addition, a plurality of transmission configuration indicator (TCI) states may be sequentially and circularly mapped to the M PUSCH groups in an ascending order.

General Device to which the Present Disclosure may be Applied

FIG. 12 is a diagram which illustrates a block diagram of a wireless communication device according to an embodiment of the present disclosure.

In reference to FIG. 12, a first wireless device 100 and a second wireless device 200 may transmit and receive a wireless signal through a variety of radio access technologies (e.g., LTE, NR).

A first wireless device 100 may include one or more processors 102 and one or more memories 104 and may additionally include one or more transceivers 106 and/or one or more antennas 108. A processor 102 may control a memory 104 and/or a transceiver 106 and may be configured to implement description, functions, procedures, proposals, methods and/or operation flow charts disclosed in the present disclosure. For example, a processor 102 may transmit a wireless signal including first information/signal through a transceiver 106 after generating first information/signal by processing information in a memory 104. In addition, a processor 102 may receive a wireless signal including second information/signal through a transceiver 106 and then store information obtained by signal processing of second information/signal in a memory 104. A memory 104 may be connected to a processor 102 and may store a variety of information related to an operation of a processor 102. For example, a memory 104 may store a software code including commands for performing all or part of processes controlled by a processor 102 or for performing description, functions, procedures, proposals, methods and/or operation flow charts disclosed in the present disclosure. Here, a processor 102 and a memory 104 may be part of a communication modem/circuit/chip designed to implement a wireless communication technology (e.g., LTE, NR). A transceiver 106 may be connected to a processor 102 and may transmit and/or receive a wireless signal through one or more antennas 108. A transceiver 106 may include a transmitter and/or a receiver. A transceiver 106 may be used together with a RF (Radio Frequency) unit. In the present disclosure, a wireless device may mean a communication modem/circuit/chip.

A second wireless device 200 may include one or more processors 202 and one or more memories 204 and may additionally include one or more transceivers 206 and/or one or more antennas 208. A processor 202 may control a memory 204 and/or a transceiver 206 and may be configured to implement description, functions, procedures, proposals, methods and/or operation flows charts disclosed in the present disclosure. For example, a processor 202 may generate third information/signal by processing information in a memory 204, and then transmit a wireless signal including third information/signal through a transceiver 206. In addition, a processor 202 may receive a wireless signal including fourth information/signal through a transceiver 206, and then store information obtained by signal processing of fourth information/signal in a memory 204. A memory 204 may be connected to a processor 202 and may store a variety of information related to an operation of a processor 202. For example, a memory 204 may store a software code including commands for performing all or part of processes controlled by a processor 202 or for performing description, functions, procedures, proposals, methods and/or operation flow charts disclosed in the present disclosure. Here, a processor 202 and a memory 204 may be part of a communication modem/circuit/chip designed to implement a wireless communication technology (e.g., LTE, NR). A transceiver 206 may be connected to a processor 202 and may transmit and/or receive a wireless signal through one or more antennas 208. A transceiver 206 may include a transmitter and/or a receiver. A transceiver 206 may be used together with a RF unit. In the present disclosure, a wireless device may mean a communication modem/circuit/chip.

Hereinafter, a hardware element of a wireless device 100, 200 will be described in more detail. It is not limited thereto, but one or more protocol layers may be implemented by one or more processors 102, 202. For example, one or more processors 102, 202 may implement one or more layers (e.g., a functional layer such as PHY, MAC, RLC, PDCP, RRC, SDAP). One or more processors 102, 202 may generate one or more PDUs (Protocol Data Unit) and/or one or more SDUs (Service Data Unit) according to description, functions, procedures, proposals, methods and/or operation flow charts included in the present disclosure. One or more processors 102, 202 may generate a message, control information, data or information according to description, functions, procedures, proposals, methods and/or operation flow charts disclosed in the present disclosure. One or more processors 102, 202 may generate a signal (e.g., a baseband signal) including a PDU, a SDU, a message, control information, data or information according to functions, procedures, proposals and/or methods disclosed in the present disclosure to provide it to one or more transceivers 106, 206. One or more processors 102, 202 may receive a signal (e.g., a baseband signal) from one or more transceivers 106, 206 and obtain a PDU, a SDU, a message, control information, data or information according to description, functions, procedures, proposals, methods and/or operation flow charts disclosed in the present disclosure.

One or more processors 102, 202 may be referred to as a controller, a micro controller, a micro processor or a micro computer. One or more processors 102, 202 may be implemented by a hardware, a firmware, a software, or their combination. In an example, one or more ASICs (Application Specific Integrated Circuit), one or more DSPs (Digital Signal Processor), one or more DSPDs (Digital Signal Processing Device), one or more PLDs (Programmable Logic Device) or one or more FPGAs (Field Programmable Gate Arrays) may be included in one or more processors 102, 202. Description, functions, procedures, proposals, methods and/or operation flow charts disclosed in the present disclosure may be implemented by using a firmware or a software and a firmware or a software may be implemented to include a module, a procedure, a function, etc. A firmware or a software configured to perform description, functions, procedures, proposals, methods and/or operation flow charts disclosed in the present disclosure may be included in one or more processors 102, 202 or may be stored in one or more memories 104, 204 and driven by one or more processors 102, 202. Description, functions, procedures, proposals, methods and/or operation flow charts disclosed in the present disclosure may be implemented by using a firmware or a software in a form of a code, a command and/or a set of commands.

One or more memories 104, 204 may be connected to one or more processors 102, 202 and may store data, a signal, a message, information, a program, a code, an instruction and/or a command in various forms. One or more memories 104, 204 may be configured with ROM, RAM, EPROM, a flash memory, a hard drive, a register, a cash memory, a computer readable storage medium and/or their combination. One or more memories 104, 204 may be positioned inside and/or outside one or more processors 102, 202. In addition, one or more memories 104, 204 may be connected to one or more processors 102, 202 through a variety of technologies such as a wire or wireless connection.

One or more transceivers 106, 206 may transmit user data, control information, a wireless signal/channel, etc. mentioned in methods and/or operation flow charts, etc. of the present disclosure to one or more other devices. One or more transceivers 106, 206 may receiver user data, control information, a wireless signal/channel, etc. mentioned in description, functions, procedures, proposals, methods and/or operation flow charts, etc. disclosed in the present disclosure from one or more other devices. For example, one or more transceivers 106, 206 may be connected to one or more processors 102, 202 and may transmit and receive a wireless signal. For example, one or more processors 102, 202 may control one or more transceivers 106, 206 to transmit user data, control information or a wireless signal to one or more other devices. In addition, one or more processors 102, 202 may control one or more transceivers 106, 206 to receive user data, control information or a wireless signal from one or more other devices. In addition, one or more transceivers 106, 206 may be connected to one or more antennas 108, 208 and one or more transceivers 106, 206 may be configured to transmit and receive user data, control information, a wireless signal/channel, etc. mentioned in description, functions, procedures, proposals, methods and/or operation flow charts, etc. disclosed in the present disclosure through one or more antennas 108, 208. In the present disclosure, one or more antennas may be a plurality of physical antennas or a plurality of logical antennas (e.g., an antenna port). One or more transceivers 106, 206 may convert a received wireless signal/channel, etc. into a baseband signal from a RF band signal to process received user data, control information, wireless signal/channel, etc. by using one or more processors 102, 202. One or more transceivers 106, 206 may convert user data, control information, a wireless signal/channel, etc. which are processed by using one or more processors 102, 202 from a baseband signal to a RF band signal. Therefor, one or more transceivers 106, 206 may include an (analogue) oscillator and/or a filter.

Embodiments described above are that elements and features of the present disclosure are combined in a predetermined form. Each element or feature should be considered to be optional unless otherwise explicitly mentioned. Each element or feature may be implemented in a form that it is not combined with other element or feature. In addition, an embodiment of the present disclosure may include combining a part of elements and/or features. An order of operations described in embodiments of the present disclosure may be changed. Some elements or features of one embodiment may be included in other embodiment or may be substituted with a corresponding element or a feature of other embodiment. It is clear that an embodiment may include combining claims without an explicit dependency relationship in claims or may be included as a new claim by amendment after application.

It is clear to a person skilled in the pertinent art that the present disclosure may be implemented in other specific form in a scope not going beyond an essential feature of the present disclosure. Accordingly, the above-described detailed description should not be restrictively construed in every aspect and should be considered to be illustrative. A scope of the present disclosure should be determined by reasonable construction of an attached claim and all changes within an equivalent scope of the present disclosure are included in a scope of the present disclosure.

A scope of the present disclosure includes software or machine-executable commands (e.g., an operating system, an application, a firmware, a program, etc.) which execute an operation according to a method of various embodiments in a device or a computer and a non-transitory computer-readable medium that such a software or a command, etc. are stored and are executable in a device or a computer. A command which may be used to program a processing system performing a feature described in the present disclosure may be stored in a storage medium or a computer-readable storage medium and a feature described in the present disclosure may be implemented by using a computer program product including such a storage medium. A storage medium may include a high-speed random-access memory such as DRAM, SRAM, DDR RAM or other random-access solid state memory device, but it is not limited thereto, and it may include a nonvolatile memory such as one or more magnetic disk storage devices, optical disk storage devices, flash memory devices or other non-volatile solid state storage devices. A memory optionally includes one or more storage devices positioned remotely from processor(s). A memory or alternatively, nonvolatile memory device(s) in a memory include a non-transitory computer-readable storage medium. A feature described in the present disclosure may be stored in any one of machine-readable mediums to control a hardware of a processing system and may be integrated into a software and/or a firmware which allows a processing system to interact with other mechanism utilizing a result from an embodiment of the present disclosure. Such a software or a firmware may include an application code, a device driver, an operating system and an execution environment/container, but it is not limited thereto.

Here, a wireless communication technology implemented in a wireless device 100, 200 of the present disclosure may include Narrowband Internet of Things for a low-power communication as well as LTE, NR and 6G. Here, for example, an NB-IoT technology may be an example of a LPWAN (Low Power Wide Area Network) technology, may be implemented in a standard of LTE Cat NB1 and/or LTE Cat NB2, etc. and is not limited to the above-described name. Additionally or alternatively, a wireless communication technology implemented in a wireless device 100, 200 of the present disclosure may perform a communication based on a LTE-M technology. Here, in an example, a LTE-M technology may be an example of a LPWAN technology and may be referred to a variety of names such as an eMTC (enhanced Machine Type Communication), etc. For example, an LTE-M technology may be implemented in at least any one of various standards including 1) LTE CAT 0, 2) LTE Cat M1, 3) LTE Cat M2, 4) LTE non-BL (non-Bandwidth Limited), 5) LTE-MTC, 6) LTE Machine Type Communication, and/or 7) LTE M and so on and it is not limited to the above-described name. Additionally or alternatively, a wireless communication technology implemented in a wireless device 100, 200 of the present disclosure may include at least any one of a ZigBee, a Bluetooth and a low power wide area network (LPWAN) considering a low-power communication and it is not limited to the above-described name. In an example, a ZigBee technology may generate PAN (personal area networks) related to a small/low-power digital communication based on a variety of standards such as IEEE 802.15.4, etc. and may be referred to as a variety of names.

INDUSTRIAL AVAILABILITY

A method proposed by the present disclosure is mainly described based on an example applied to 3GPP LTE/LTE-A, 5G system, but may be applied to various wireless communication systems other than the 3GPP LTE/LTE-A, 5G system.

What is claimed is:

1. A method of repeatedly transmitting a physical uplink shared channel (PUSCH) by a terminal in a wireless communication system, the method comprising:
   receiving configuration information related to repeated transmission of the PUSCH;
   receiving downlink control information (DCI) for scheduling the PUSCH; and
   repeatedly transmitting the PUSCH N times (N is an integer greater than 1) based on the configuration information and the DCI,
   wherein a plurality of transmission configuration indicator (TCI) states are sequentially and circularly mapped to the N PUSCHs in an ascending order,
   wherein PUSCHs mapped with an identical TCI are grouped into M (N is an integer greater than 1) PUSCH groups,
   wherein frequency hopping is individually applied to the M PUSCH groups.

2. The method of claim 1,
   wherein the N PUSCHs are transmitted repeatedly in N slots by transmitting one PUSCH in one slot,
   wherein the frequency hopping is applied at the slot level.

3. The method of claim 1,
   wherein the N PUSCHs are transmitted in units of a plurality of symbols,
   wherein the frequency hopping is applied for each transmission occasion of the N PUSCHs.

4. The method of claim 3,
   wherein a symbol gap exists between contiguous PUSCHs in the N PUSCHs.

5. The method of claim 1,
wherein the M PUSCH groups are transmitted to different transmission reception points (TRPs) using the TCI state mapped to each group,
wherein the M PUSCH groups are transmitted by applying a precoder and a modulation and coding scheme (MCS) based on a channel of each TRP.

6. The method of claim 1,
wherein the plurality of TCI states are configured by higher layer signaling.

7. A terminal for repeatedly transmitting a physical uplink shared channel (PUSCH) in a wireless communication system, the terminal comprising:
at least one transceiver for transmitting and receiving a radio signal; and
at least one processor for controlling the at least one transceiver,
wherein the at least one processor is configured to:
receive configuration information related to repeated transmission of the PUSCH;
receive downlink control information (DCI) for scheduling the PUSCH; and
repeatedly transmit the PUSCH N times (N is an integer greater than 1) based on the configuration information and the DCI,
wherein a plurality of transmission configuration indicator (TCI) states are sequentially and circularly mapped to the N PUSCHs in an ascending order,
wherein PUSCHs mapped with an identical TCI are grouped into M (N is an integer greater than 1) PUSCH groups,
wherein frequency hopping is individually applied to the M PUSCH groups.

8. The terminal of claim 7,
wherein the N PUSCHs are transmitted repeatedly in N slots by transmitting one PUSCH in one slot,
wherein the frequency hopping is applied at the slot level.

9. The terminal of claim 7,
wherein the N PUSCHs are transmitted in units of a plurality of symbols,
wherein the frequency hopping is applied for each transmission occasion of the N PUSCHs.

10. The terminal of claim 9,
wherein a symbol gap exists between contiguous PUSCHs in the N PUSCHs.

11. The terminal of claim 7,
wherein the M PUSCH groups are transmitted to different transmission reception points (TRPs) using the TCI state mapped to each group,
wherein the M PUSCH groups are transmitted by applying a precoder and a modulation and coding scheme (MCS) based on a channel of each TRP.

12. At least one non-transitory computer-readable medium storing at least one instruction,
wherein the at least one instruction executable by at least one processor controls a device for repeatedly transmitting a physical uplink shared channel (PUSCH) in a wireless communication system to:
receive configuration information related to repeated transmission of the PUSCH;
receive downlink control information (DCI) for scheduling the PUSCH; and
repeatedly transmit the PUSCH N times (N is an integer greater than 1) based on the configuration information and the DCI,
wherein a plurality of transmission configuration indicator (TCI) states are sequentially and circularly mapped to the N PUSCHs in an ascending order,
wherein PUSCHs mapped with an identical TCI are grouped into M (N is an integer greater than 1) PUSCH groups,
wherein frequency hopping is individually applied to the M PUSCH groups.

* * * * *